US012737472B2

(12) United States Patent
Park et al.

(10) Patent No.: US 12,737,472 B2
(45) Date of Patent: Sep. 15, 2026

(54) ELECTRONIC DEVICE, METHOD, AND NON-TRANSITORY COMPUTER-READABLE STORAGE MEDIUM FOR PERFORMING MOUNT OPERATION FOR PART OF PARTITION

(71) Applicant: SAMSUNG ELECTRONICS CO., LTD., Suwon-si (KR)

(72) Inventors: Hyungsik Park, Suwon-si (KR); Kyoungchurl Lyoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/907,122

(22) Filed: Oct. 4, 2024

(65) Prior Publication Data

US 2025/0028837 A1 Jan. 23, 2025

Related U.S. Application Data

(63) Continuation of application No. PCT/KR2023/010231, filed on Jul. 17, 2023.

(30) Foreign Application Priority Data

Jul. 22, 2022 (KR) ........................ 10-2022-0091356
Jul. 17, 2023 (KR) ........................ 10-2023-0092500

(51) Int. Cl.
*G06F 21/57* (2013.01)
*G06F 21/60* (2013.01)
*G06F 21/78* (2013.01)

(52) U.S. Cl.
CPC .......... *G06F 21/575* (2013.01); *G06F 21/604* (2013.01); *G06F 21/78* (2013.01)

(58) Field of Classification Search
CPC ....... G06F 21/575; G06F 21/604; G06F 21/78
(Continued)

(56) References Cited

U.S. PATENT DOCUMENTS 6,119,212 A 9/2000 Gross et al.
9,063,792 B2 6/2015 Ali et al.
9,442,802 B2 9/2016 Hung
9,619,161 B2 4/2017 Kwon
(Continued)

FOREIGN PATENT DOCUMENTS

CN 1971498 A 5/2007
CN 106357921 A 1/2017
(Continued)

OTHER PUBLICATIONS

International Search Report dated Nov. 6, 2023, issued by the International Searching Authority in International Application No. PCT/KR2023/010231.

(Continued)

*Primary Examiner* — Michael S McNally
(74) *Attorney, Agent, or Firm* — Sughrue Mion, PLLC

(57) ABSTRACT

At least one processor of an electronic device according to an embodiment may turn off the electronic device, on the basis of an input identified while directory names are associated with storage areas of the memory on the basis of a first mount operation within a first mode of the electronic device, such that the directory names are dissociated from the storage areas, and may turn on the electronic device in order to boot same in a second mode. The processor may identify a part of the storage areas in which log information is stored while the electronic device is booted in a second mode. The processor may perform a second mount operation in order to associate a part of the directory names with the part of the storage areas while the remaining part of the storage areas is disassociated from the remaining part of the
(Continued)

directory names in order to deactivate access to information stored in the remaining part of the storage areas.

14 Claims, 14 Drawing Sheets

(58) Field of Classification Search
USPC ........................................................ 726/26
See application file for complete search history.

(56) References Cited

U.S. PATENT DOCUMENTS

| | | | | |
|---|---|---|---|---|
| 9,846,790 | B2 | 12/2017 | Andersson et al. | |
| 11,188,279 | B2 | 11/2021 | Sugano | |
| 11,308,230 | B2 | 4/2022 | Hajnoczi et al. | |
| 11,593,787 | B2 | 2/2023 | Lee et al. | |
| 11,941,264 | B2 | 3/2024 | Kim | |
| 2009/0089569 | A1* | 4/2009 | Baribault | G06F 21/575 713/2 |
| 2017/0177281 | A1 | 6/2017 | Sugano | |
| 2019/0005247 | A1 | 1/2019 | Lee | |
| 2019/0095625 | A1 | 3/2019 | Surdu | |
| 2020/0225901 | A1 | 7/2020 | Boissiere et al. | |
| 2020/0302061 | A1 | 9/2020 | Rizos | |
| 2021/0410013 | A1 | 12/2021 | Yang et al. | |
| 2022/0075866 | A1* | 3/2022 | Gagne-Keats | G06F 9/441 |
| 2022/0107920 | A1 | 4/2022 | Hayes et al. | |
| 2022/0300206 | A1* | 9/2022 | Furuta | G06F 3/0683 |
| 2023/0111120 | A1* | 4/2023 | Thakre | G06F 9/441 713/2 |

FOREIGN PATENT DOCUMENTS

| | | | |
|---|---|---|---|
| JP | 2017-509941 | A | 4/2017 |
| JP | 2021-174432 | A | 11/2021 |
| KR | 10-0794116 | B1 | 1/2008 |
| KR | 10-1373542 | B1 | 3/2014 |
| KR | 10-2019-0003055 | A | 1/2019 |
| KR | 10-2020-0063948 | A | 6/2020 |
| KR | 10-2021-0023161 | A | 3/2021 |
| KR | 10-2021-0039629 | A | 4/2021 |
| KR | 10-2406099 | B1 | 6/2022 |

OTHER PUBLICATIONS

Written Opinion dated Nov. 6, 2023, issued by the International Searching Authority in International Application No. PCT/KR2023/010231.

Communication dated Oct. 8, 2024, issued by the European Patent Office in European Application No. 23741966.8.

Communication issued Mar. 17, 2025 by the European Patent Office in European Patent Application No. 23741966.8.

Communication dated Sep. 26, 2025, issued by the European Patent Office in European Application No. 23741966.8.

Communication issued Jun. 17, 2026 by the European Patent Office in European Patent Application No. 26180793.7.

Office Action dated Jun. 22, 2026, issued by Intellectual Property India in Indian Patent Application No. 202417090370.

* cited by examiner

ELECTRONIC DEVICE, METHOD, AND NON-TRANSITORY COMPUTER-READABLE STORAGE MEDIUM FOR PERFORMING MOUNT OPERATION FOR PART OF PARTITION

CROSS-REFERENCE TO RELATED APPLICATIONS

This application is a continuation of International Application No. PCT/KR2023/010231 designating the United States, filed on Jul. 17, 2023, in the Korean Intellectual Property Receiving Office and claiming priority to Korean Patent Application Nos. 10-2023-0092500, filed on Jul. 17, 2023, and 10-2022-0091356, filed on Jul. 22, 2022, in the Korean Intellectual Property Office, the disclosures of each of which are incorporated by reference herein in their entireties.

BACKGROUND

Field

Various embodiments of the disclosure relate to an electronic device, a method, and a non-transitory computer readable storage medium for performing a mount operation regarding a portion of a partition.

Description of Related Art

A partition may be a unit for dividing storage. Within the storage, for example, a plurality of partitions may be formed based on categories of files and/or directories. In other words, the storage may be divided, partitioned or separated into a plurality of partitions, sections, areas, regions, sub-modules, and/or sub-units based on one or more categories of files and/or directories within the storage. The data within the storage may be allocated to or stored in one or more of the partitioned areas based on a type, characteristic or any other feature of or relating to the data. An electronic device connected to the storage may access the storage based on the plurality of partitions. That is, the electronic device connected to the storage may access one or more of the partitioned areas of the storage.

SUMMARY

According to an embodiment, an electronic device may comprise at least one processor, memory configured to store instructions which, when executed by the at least one processor, cause the electronic device to identify a user input while the electronic device is operating in a first mode wherein, in the first mode of the electronic device, each of a plurality of storage areas is associated with a corresponding directory name based on a first mounting operation in a first mode. The instructions are configured to, when executed by the processor, cause the electronic device to, in response to the identified user input, turn off the electronic device to cause the directory names to be disassociated from the corresponding storage areas, and turn on the electronic device to boot the electronic device to a second mode. The instructions are configured to, when executed by the processor, cause the electronic device to, while the electronic device is being booted to the second mode, identify a portion of the plurality of storage areas in which log information is stored. The instructions are configured to, when executed by the processor, cause the electronic device to, perform a second mounting operation, different from the first mounting operation, to associate a portion of the directory names with the identified portion of the storage areas, and to not associate a remaining portion of the storage areas with a remaining portion of the directory names such that the remaining portion of the directory names remains disassociated with the remaining portion of the storage areas to disable an access to information stored in the remaining portion of the storage areas.

According to an embodiment, a method of an electronic device may comprise identifying a user input while the electronic device is operating in a first mode wherein, in the first mode of the electronic device, each of a plurality of storage areas of memory of the electronic device is associated with a corresponding directory name based on a first mounting operation. The method may comprise, in response to identified user the input, turning off the electronic device to cause the directory names to be disassociated from the corresponding storage areas and turning on the electronic device to boot the electronic device to a second mode. The method may comprise, while the electronic device being booted to the second mode, identifying a portion of the plurality of the storage areas in which log information is stored. The method may comprise performing a second mounting operation, different from the first mounting operation, to associate a portion of the directory names while the identified portion of the storage areas, and to not associate a remaining portion of the storage areas with a remaining portion of the directory names such that the remaining portion of the directory names remains diassociated with the remaining portion of the storage areas to disable access to information stored in the remaining portion of the storage areas.

According to an embodiment, a non-transitory computer readable storage medium for storing one or more programs may be provided. The one or more programs are, when executed by a processor of the electronic device, cause the electronic device to identify a user input while the electronic device is operating in a first mode. In the first mode of the electronic device, each of a plurality of storage areas is associated with a corresponding directory name based on a first mounting operation. The one or more programs are configured to, when executed by the processor, cause the electronic device to, in response to the identified user input, turn off the electronic device to cause the directory names to be disassociated from the corresponding storage areas, and turn on the electronic device to boot the electronic device to a second mode. The one or more programs are configured to, when executed by the processor, cause the electronic device to, while the electronic device is being booted to the second mode, identify a portion of the plurality of storage areas in which log information is stored. The one or more programs are configured to, when executed by the processor, cause the electronic device to, perform a second mounting operation, different from the first mounting operation, to associate a portion of the directory names with the identified portion of the storage areas, and to not associate a remaining portion of the storage areas with a remaining portion of the directory names such that the remaining portion of the directory names remains disassociated with the remaining portion of the storage areas to disable an access to information stored in the remaining portion of the storage areas.

According to an embodiment, an electronic device may comprise a memory configured to store instructions, a display, and a processor. The instructions are configured to, when executed by the processor, cause the electronic device to identify a request to access the memory after booting up the electronic device. The instructions are configured to, when executed by the processor, cause the electronic device to control the access to the memory, while the electronic device is booted up with a first mounting operation, based on first list of directory names associated with storage areas of the memory. The instructions are configured to, when executed by the processor, cause the electronic device to control the access to the memory, while the electronic device is booted up with a second mounting operation, based on second list of a portion of the directory names associated with a portion of the storage areas. The remaining portion of the directory names are disassociated with remaining portion of the storage areas according to the second mounting operation.

According to an embodiment, the electronic device may comprise a storage comprising a plurality of areas and a processor. The processor may be configured to identify whether an input for performing a mounting operation based on a second authority information has been received. The first authority information allows access to all of the plurality of areas of a storage of the electronic device and the second authority information is different to the first authority information. The processor may be configured to obtain, in a first state in which the input for performing the mounting operation based on the second authority information is received, at least one directory name assigned to at least one first area from among the plurality of areas of the storage. The processor may be configured to not obtain, in the first state, at least one directory name assigned to at least one second area different to the at least one first area, from among the plurality of areas of the storage. The at least one second area corresponds to an area of the storage area in which the second authority information does not allow access.

According to an embodiment, an electronic device may comprise a storage and a processor. The processor may be configured to identify, among a first authority information accessible to all areas of the storage and a second authority information different from the first authority information, whether an input indicating performing a mount operation based on the second authority information is received. The processor may be configured to obtain, in a first state in which the input is received, at least one directory name assigned to at least one area among the areas based on the second authority information, and bypass performing the mount operation based on the first authority information. The processor may be configured to obtain, in a second state different from the first state, a plurality of directory names assigned to each of the areas based on the first authority information.

According to an embodiment, a method of an electronic device may comprise identifying, among a first authority information accessible to all areas of a storage of the electronic device and a second authority information different from the first authority information, whether an input indicating performing a mount operation based on the second authority information is received. The method may comprise obtaining, in a first state in which the input is received, at least one directory name assigned to at least one area among the areas based on the second authority information, and bypassing performing the mount operation based on the first authority information. The method may comprise obtaining, in a second state different from the first state, a plurality of directory names assigned to each of the areas based on the first authority information.

According to an embodiment, a non-transitory computer readable storage medium for storing one or more programs, the one or more programs may comprise instructions which, when executed by a processor of the electronic device, cause the electronic device to identify, among a first authority information accessible to all areas of the storage and a second authority information different from the first authority information, whether an input indicating performing a mount operation based on the second authority information is received. The one or more programs may comprise instructions that cause the electronic device to obtain, in a first state in which the input is received, at least one directory name assigned to at least one area among the areas based on the second authority information, and bypass performing the mount operation based on the first authority information. The one or more programs may comprise instructions that cause the electronic device to obtain, in a second state different from the first state, a plurality of directory names assigned to each of the areas based on the first authority information.

DETAILED DESCRIPTION

Figure 1:
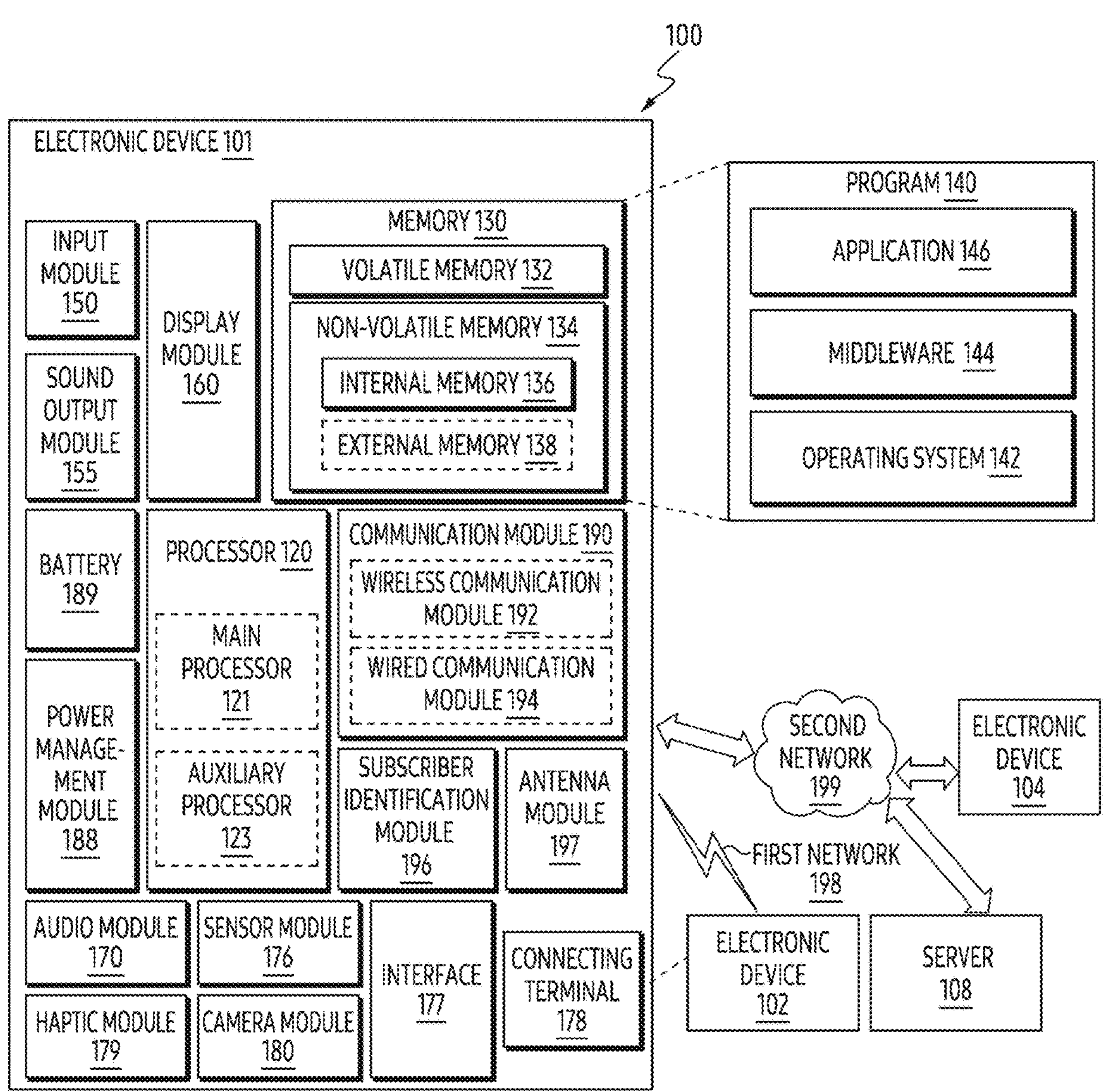
FIG. 1 is a block diagram of an electronic device in a network environment according to various embodiments.

Hereinafter, various embodiments of the present document will be described with reference to the accompanying drawings.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
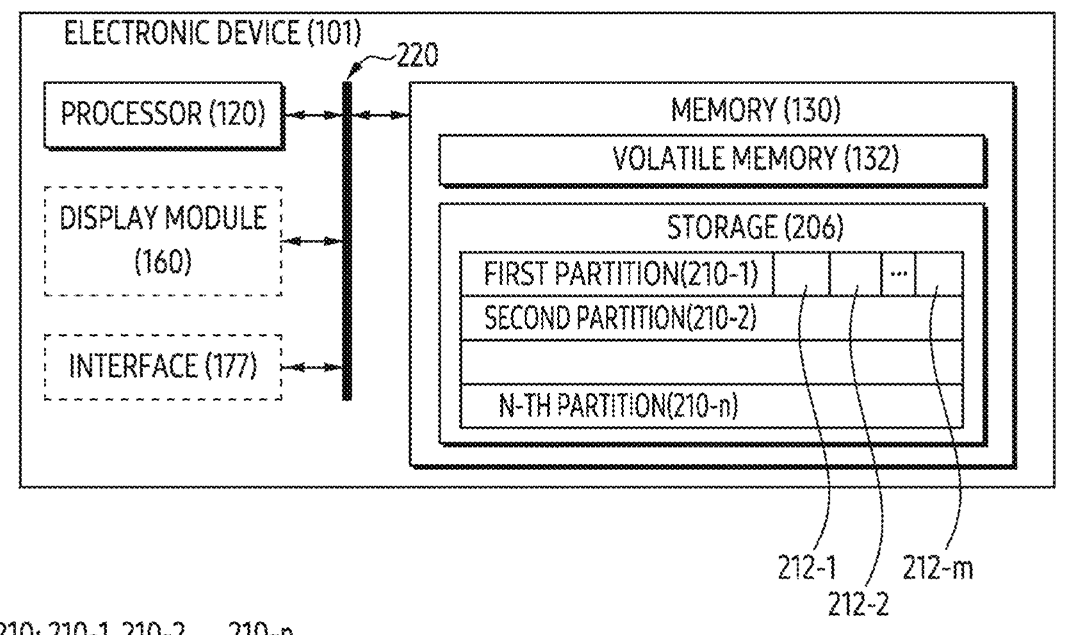
FIG. 2 illustrates an example of a plurality of partitions in a storage and areas in the plurality of partitions that the electronic device identifies from the storage, according to an embodiment.

FIG. 2 illustrates an example of a plurality of partitions in a storage and areas in the plurality of partitions that the electronic device 101 identifies as storage, according to an embodiment. The electronic device 101 of FIG. 2 may include or be the same as the electronic device 101 of FIG. 1. The electronic device 101 of FIG. 2 may be a terminal owned by a user. For example, the terminal may include a personal computer (PC) such as a laptop or a desktop, a smartphone, a smart pad, a tablet PC, smart accessories such as a smartwatch, or a head-mounted device (HMD).

Referring to FIG. 2, the electronic device 101 according to an embodiment may include at least one of a processor or controller 120, a memory 130, a display module 160, or an interface 177. The processor 120, the memory 130, the display module 160, or the interface 177 may be electrically and/or operably coupled with each other by electronic components such as a communication bus 220. Operably coupled hardware may indicate that a direct connection or an indirect connection between the hardware is established by wire or wirelessly, so that the second hardware is controlled by the first hardware among the hardware. According to an embodiment, one or more hardware included in the electronic device 101 has been illustrated based on different blocks, but the embodiment is not limited thereto, and a portion of the hardware (e.g., the processor 120 and at least a portion of the memory 130) of FIG. 2 may be included in a single integrated circuit such as a system on a chip (SoC). The type and/or number of hardware included in the electronic device 101 is not limited as illustrated in FIG. 2. For example, the electronic device 101 may include only a portion of the hardware illustrated in FIG. 2.

The processor or controller 120 of electronic device 101 according to an embodiment may include a hardware for processing data based on one or more instructions. For example, hardware for processing data may include an arithmetic and logic unit (ALU), a floating point unit (FPU), a field programmable gate array (FPGA), and/or a central processing unit (CPU). The number of processors 120 may be one or more. For example, the processor 120 may have a structure of a multi-core processor such as a dual core, a quad core, or a hexa core. The processor 120 of FIG. 2 may include or be the same as the processor 120 of FIG. 1.

According to an embodiment, the memory 130 of the electronic device 101 may include a hardware for storing data and/or instructions input and/or output to the processor 120. For example, the memory 130 may include volatile memory such as random-access memory (RAM) and/or non-volatile memory such as read-only memory (ROM). For example, the volatile memory may include at least one of dynamic RAM (DRAM), static RAM (SRAM), cache RAM, or pseudo SRAM (PSRAM). For example, the nonvolatile memory may include at least one of a programmable ROM (PROM), an erasable PROM (EPROM), an electrically erasable PROM (EEPROM), a flash memory, a hard disk, a compact disk, or an embedded multi-media card (eMMC). The nonvolatile memory may be referred to as a storage unit, a storage module, a storage region, a storage area, a storage portion, or a storage 206. The memory 130 of FIG. 2 may include or be the same as the memory 130 of FIG. 1.

In the memory 130, one or more instructions indicating a calculation and/or an operation to be performed on data by the processor 120 may be stored. A set of one or more instructions may be referred to as a firmware, an operating system, a process, a routine, a sub-routine, and/or an application. For example, when a set of a plurality of instructions distributed in the form of the operating system, the firmware, a driver, and/or the application is executed, the electronic device 101 and/or the processor 120 may perform at least one of the operations of FIGS. 7 to 8. Hereinafter, that the application is installed in the electronic device 101 may indicate that one or more instructions provided in the form of the application are stored in the memory 130 of the electronic device 101, and in other words, it may indicate that the one or more applications are stored in an executable format (e.g., a file with an extension designated by the operating system of the electronic device 101) by the processor 120 of the electronic device 101.

According to an embodiment, the display module 160 of the electronic device 101 may output visualized or visual information (e.g., at least one of the screens of FIGS. 3 to 4) to a user. For example, the display module 160 may be controlled by a controller such as the processor 120 to output visualized information to a user. The display module 160 may include a flat panel display (FPD) and/or electronic paper. The FPD may include a liquid crystal display (LCD), a plasma display panel (PDP), and/or one or more light emitting diodes (LED). The LED may include an organic LED (OLED). The display module 160 of FIG. 2 may include the display module 160 of FIG. 1.

According to an embodiment, the processor 120 of the electronic device 101 may execute instructions stored in the memory 130 to execute functions related to the electronic device 101. A process and/or instance may refer to a unit of function and/or operation executed by the processor 120 of the electronic device 101. According to an embodiment, the electronic device 101 may control the execution of the process based on authority information. The authority information may indicate a user logged into electronic device 101 or a subject who executed the process. For example, when an input indicating that the application is executed is received from the user, the electronic device 101 may generate a process corresponding to the application based on the authority information corresponding to the user. For example, when the execution of a specific process by the operating system of the electronic device 101 is requested, the electronic device 101 may generate the specific process based on the authority information corresponding to the operating system. Different users may have different authority information corresponding to them, so the processes available to be performed by each user may be different due to the different authority information for each user. That is, not all of the processes, functions or applications of an electronic device may be available to every user of the electronic device due to the different authority information which may be associated with each of the users.

According to an embodiment, the electronic device 101 may distinguish different users accessing the electronic device 101 and/or different processes executed in the electronic device 101, based on one or a plurality of authority information. For example, each of the plurality of authority information may include a parameter indicating a resource of electronic device 101 accessible by a process and/or performing a process executed based on the authority information. The authority information may include authority information corresponding to a user who owns the electronic device 101 like an owner user. The authority information may include authority information corresponding to another user who is allowed limited access to the electronic device 101, such as a sub-user. The sub-user may comprise a user performing a repair to the electronic device, such as an employee of a repair shop. The sub-user may comprise a friend or relative of the owner user, wherein the owner user may wish to control or limit the sub-user's access to the electronic device. An area within the storage 206 accessible by a specific sub-user may be an area in which access by other sub-users is limited. For example, based on the execution of a specific process (e.g., a core process) executed based on the owner user's authority information, the electronic device 101 may access an area that is uniquely accessible to the sub-user. According to an embodiment, an operation of receiving an input indicating that the electronic device 101 selects any one of the plurality of authority information will be described with reference to FIGS. 3 to 4.

According to an embodiment, the storage 206 may be divided, partitioned or otherwise provided into one or more partitions 210. According to an embodiment the electronic device 101 may identify a partition 210 formed in the storage 206. The partition 210 is a unit that manages data (e.g., a file, and/or a directory) stored in the storage 206 and may be referred to as a volume and/or a logical drive. The partition 210 may also be known as a region, sector, segment, unit or portion of the storage 206. The partition 210 may include at least a portion of a single nonvolatile memory, or may be formed by merging different parts of different nonvolatile memories. The number of partitions 210 formed in the storage 206 may be one or more. Referring to FIG. 2, according to an embodiment, n partitions (e.g., a first partition 210-1, a second partition 210-2, . . . , and a n-th partition **210-*n*) in the storage 206 of the electronic device 101 is illustrated. The partitions in the storage 206 may be formed by the electronic device 101 to store data of different categories. For example, the first partition 210-1 may store data related to one or more interactions between the electronic device 101 and a user. In terms of storing data related to one or more interactions between the electronic device 101 and a user, the first partition 210-1 may be referred to as a user partition. For example, the second partition 210-2 may store data (e.g., system data) used by the operating system executed by the processor 120 of the electronic device 101. In terms of storing the system data, the second partition 210-2 may be referred to as a system partition. The embodiment is not limited thereto, and the partitions may include a partition for storing cache data, and/or a partition in which data provided by a vendor of the electronic device 101** is stored.

According to an embodiment, a partition 210 may itself be divided into one or more sub-partitions or areas. According to an embodiment the electronic device 101 may identify an area 212 in the partition 210. In an embodiment of FIG. 2, m areas (e.g., a first area 212-1, a second area 212-2, . . . and a m-th area **212-*m*) formed in the first partition 210-1 based on the interaction between the electronic device 101 and the user are illustrated. The m areas formed in the first partition 210-1 may correspond to directories included in the first partition 210-1. For example, the area 212 in the first partition 210-1 may correspond to a directory included in a logical drive formed based on the first partition 210-1. The directory may be a structure for classifying files stored in the partition 210. The structure may include a top-level directory. Other directories included in the structure may be directly or indirectly connected to the top-level directory. The m areas formed in the first partition 210-1** may correspond to different directories included in the structure.

According to an embodiment, the electronic device 101 may perform a mount operation for the partition 210 and/or the area 212. The mount operation may also be known as a mount, a mount process, a mounting operation or a mounting process. The performing of a mount operation may include assigning text for calling or naming or identifying the partition 210 and/or the area 212. The naming, calling or identifying operation of the area 212 and/or the partition 210 may comprise an operation associating and/or linking text (e.g., the directory name) to the area 212 and/or partition 210. The text may be uniquely assigned to the partition 210 and/or the area 212. The text uniquely assigned to the partition 210 and/or the area 212 may be referred to as a directory name. Referring to FIG. 2, the directory name may be text in which a name assigned to the area 212 and at least one upper directory including the area 212 are connected based on the specified text (e.g. the delimiter such as "/"). For example, in case that the area 212 included in the top-level directory has a name "dir212" and a directory name assigned to the first partition 210-1 including the area 212 is "data", a directory name assigned to the area 212 may be "/data/dir212". In the above example, when the area 212 is a subdirectory of the top-level directory and is a subdirectory of another area having a name "dir919", a directory name assigned to the area 212 may be "/data/dir919/dir212". According to an embodiment, an operation in which the electronic device 101 performs a mount based on one or more processes executed by the processor 120 will be described with reference to FIGS. 5 and/or 6A to 6B.

According to an embodiment, the electronic device 101 may control a mount operation regarding the partition 210 and/or the area 212 in the storage 206 based on authority information. For example, the electronic device 101 may perform a mount operation regarding the partition 210 in the storage 206 and all areas included in the partition 210, based on first authority information related to the owner user. For example, the electronic device 101 may perform a mount operation for or regarding a first portion of a plurality of the partitions included in the storage 206 and refrain from performing a mount operation for or regarding another partition provided in a second portion of a plurality of partitions different from the first portion, based on second authority information related to another user (e.g., the sub-user) that is different from the owner user, wherein the first authority information and the second authority information are different. For example, based on the second authority information, the electronic device 101 may perform a mount operation regarding, for, or in relation to a first portion of the areas included in the first partition 210-1, and may at least temporarily stop or not perform a mount operation regarding another area not included in the first portion of areas. The electronic device may at least temporarily stop or not perform a mount operation regarding a second portion of areas different from the first portion of areas. In other words, the electronic device may only perform a mount operation in respect to the portions of the storage which correspond to the provided authority information.

As described above, the electronic device 101 according to an embodiment may receive an input indicating that one of a first authority information accessible to all areas of the storage 206 and a second authority information different from the first authority information is selected. The input may be an input made by a user of the electronic device 101. The second authority information may be set to allow partial access to areas of the storage 206. That is, the second authority information may be set to allow access to some of the areas of the storage 206, but not all of the areas of the storage. For each area from among the plurality of areas of the storage, the second authority information may allow partial, full, or no access to the area. In a state in which the first authority information is selected or indicated by the input, the electronic device 101 may obtain a plurality of directory names assigned to each of the areas. Based on the plurality of directory names, the electronic device 101 may perform a mount operation regarding, in relation to, or for all of the areas of the storage. That is, all of the areas of the storage 206 may be mounted in the case where a state in which the first authority information is selected or indicated by the input. In another state in which the second authority information is selected or indicated by the input, the electronic device 101 may obtain at least one directory name assigned to at least one area indicated by the second authority information among the areas. Based on the at least one directory name, the electronic device 101 may perform a mount operation regarding, in relation to, or for at least one area among the plurality of areas of the storage. Since the electronic device 101 performs a mount operation regarding at least one area among the plurality of areas in the other state, access to other areas different from the at least one area may be fundamentally blocked. That is, access to the areas of the storage which are not mounted is blocked, so these areas cannot be accessed. For example, the electronic device 101 may completely block access to the other areas different to the at least one area which is mounted, based on the second authority information. Since the electronic device 101 completely blocks access to the other areas, that is the areas which are not mounted, the electronic device 101 may protect data (e.g., data related to privacy) stored in the other areas which are not mounted.

Hereinafter, referring to FIGS. 3 to 4, an example of an operation of receiving an input indicating that an electronic device 101 according to an embodiment selects any one of a plurality of authority information will be described.

Figure 3:
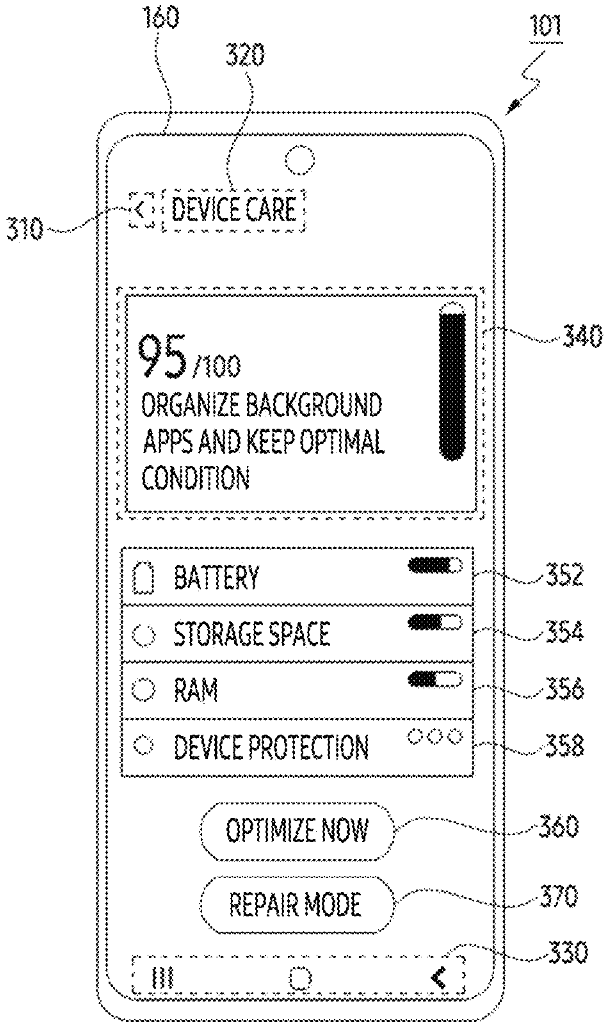
FIG. 3 illustrates an example of an operation of receiving an input indicating that an electronic device performs a mount operation regarding a portion of a plurality of areas in a storage, according to an embodiment.

FIG. 3 illustrates an example of an operation of receiving an input from a user indicating that an electronic device 101 is to perform a mount operation regarding a portion of a plurality of areas in a storage, according to an embodiment. The electronic device 101 of FIG. 3 may include the electronic device 101 of FIGS. 1 to 2. For example, the electronic device 101, the display module 160, and the storage 206 of FIG. 2 may include the electronic device 101, a display module 160, and a storage of FIG. 3. Referring to FIG. 3, according to an embodiment, an example of a screen displayed by the electronic device 101 to the user through the display module 160 is illustrated. Hereinafter, the screen may refer to a user interface (UI) displayed in at least a portion of the display. For example, the screen may include an activity of an Android operating system.

According to an embodiment, the electronic device 101 may display the screen of FIG. 3 in response to an input indicating the execution of a designated application (e.g., a "setting application"). The input may include a gesture of touching and/or clicking a designated menu (e.g., a menu that displays text such as "Device Care") related to a state of hardware included in the electronic device 101, on another screen displayed within the display module 160 based on the execution of the specified application.

According to an embodiment, the electronic device 101 may display a visual object 310, which is an icon for switching to another screen displayed before the screen of FIG. 3 within the display module 160, in the screen of FIG. 3. The electronic device 101 may display text including a name (e.g., "device care") assigned to the screen within the screen of FIG. 3, in a portion 320 of the screen or display. The electronic device 101 may display executable objects related to switching between applications executed in the electronic device 101 within the screen of FIG. 3, in a portion 330 of the screen or display. In an embodiment, the portion 330 may be referred to as a navigation bar. In the portion 330, the electronic device 101 may display at least one of a button for displaying a designated screen (e.g., a home screen) provided by the launcher application, a button for displaying a list of a plurality of applications executed by electronic device 101, or a button for switching between the screens based on a stack of screens displayed in the display module 160.

According to an embodiment, the electronic device 101 may display one or more visual objects related to the state of the electronic device 101 in the screen of FIG. 3. For example, the electronic device 101 may display information related to the electronic device 101 (e.g., a score that evaluates the state of the electronic device 101) within a portion 340 of the screen, based on numbers, and/or progress bar. For example, the electronic device 101 may display a state of a battery (e.g., the battery 189 of FIG. 1) of the electronic device 101 within a portion 352 of the screen. Referring to FIG. 3, in the portion 352, the electronic device 101 may display text indicating a state of the battery (e.g., "charging", a current level of charge of the battery, or a time when the battery is expected to be completely discharged). In response to an input indicating that the portion 352 is selected, the electronic device 101 may display another screen for indicating the state of the battery from the screen of FIG. 3. For example, the electronic device 101 may display a state of a storage (e.g., the storage 206 of FIG. 2) within a portion 354 of the screen. Referring to FIG. 3, within the portion 354, the electronic device 101 may display at least one of the total capacity of the storage or the capacity of at least a portion of the storage occupied by data. For example, the electronic device 101 may display a state of a memory (e.g., the volatile memory 132 of FIG. 2) within a portion 356 of the screen. Referring to FIG. 3, within the portion 356, the electronic device 101 may display at least one of the total capacity of the memory or the capacity of at least a portion of the memory occupied by data. For example, the electronic device 101 may display a state related to the security of the electronic device 101 within a portion 358 of the screen. Referring to FIG. 3, within the portion 358, the electronic device 101 may display the state related to the security based on different levels (e.g., "serious", "need a test", and/or "no problem found").

In the screen of FIG. 3, the electronic device 101 may display visual objects 360 and 370 that are buttons for receiving an input to switch the state of the electronic device 101. Although an example of a screen on which all the visual objects 360 and 370 are displayed is illustrated, an embodiment is not limited thereto. The electronic device 101 may display the visual object 360 that is a button for selectively deactivating at least one of the applications executed by the electronic device 101 or for removing applications that are at least temporarily stored in volatile memory (e.g., caching) from the volatile memory.

According to an embodiment, the electronic device 101 may display a visual object 370 for switching a state of the electronic device 101 from a first state in which mount of all areas in a storage (e.g., the storage 206 of FIG. 2) is performed to a second state in which mount of a specific area is bypassed among the areas. In other words, selecting the visual object 370 may switch the electronic device 101 from a first state in which all of the areas in a storage are mounted, to a second state in which only some of the areas of the storage are mounted. That is, in the second state one or more specific areas of the storage are not mounted. The first state may include a state in which the electronic device 101 is booted based on a first authority information (e.g., authority information regarding the owner user) accessible to all of the areas. The first state may be referred to as a normal state and a normal boot-up state. The second state may include a state in which the electronic device 101 is booted based on a second authority information (e.g., authority information regarding the sub-user) different from the first authority information. The second state may include a state driven based on a user different from a user (e.g., the owner user) who owns the electronic device 101. The second state may be referred to as a maintenance mode, a repair mode, a repair state, a limited state, and/or a safe mode. According to an embodiment, the electronic device 101 may display the visual object 370 within the screen of FIG. 3, in the first state.

According to an embodiment, in response to an input indicating that the visual object 370 is selected, the electronic device 101 may switch from the first state in which all areas of the storage are mounted to a second state in which a mount operation is performed based on specific authority information (e.g., the second authority information) corresponding to the visual object 370. That is, the electronic device may switch from the first state in which all of the areas of the storage are mounted (and therefore accessible) to a second state in which only some of the areas of the storage are mounted, and other areas of the storage are not mounted. The areas of the storage which are not mounted are not accessible to the user of the device. The determination of which areas of the storage are or are not mounted in the second state is based on the second authority information corresponding to the visual object 370 and the second state. In order to switch from the first state to the second state, the electronic device 101 may perform a reboot. Based on the reboot, the electronic device 101 may release the mounting (e.g., unmount, disassociate, unlink, disconnect) of all areas of the storage, and may perform a mount operation of a portion of the areas indicated by the specific authority information among the areas. That is, after the electronic device has rebooted, all of the areas of the storage may be unmounted, and a mount operation or process may then be performed on one or more areas of the storage from among all of the areas of the storage according to the authority information of each of the areas. Therefore, in the second state, not all of the areas of the storage may be mounted. According to an embodiment, the electronic device 101 may display a pop-up window confirming whether to switch from the first state to the second state in response to the input. The pop-up window may include text to guide the switching to the second state based on the personal identification number (PIN), password, and/or input of biometric signal (e.g., fingerprint, iris, face, and/or speech) to be compared with the biometric information pre-registered in the electronic device 101.

According to an embodiment, the visual object 370 displayed to receive an input indicating that the electronic device 101 is to perform a mount operation regarding a portion of the areas within the storage is not limited to the embodiment of FIG. 3. Hereinafter, referring to FIG. 4, an example of an operation in which the electronic device 101 according to an embodiment identifies at least one area in which a mount operation will be performed among all of the areas of the storage, based on a user input indicating that any one of the users registered in the electronic device 101 is selected, will be described.

Figure 4:
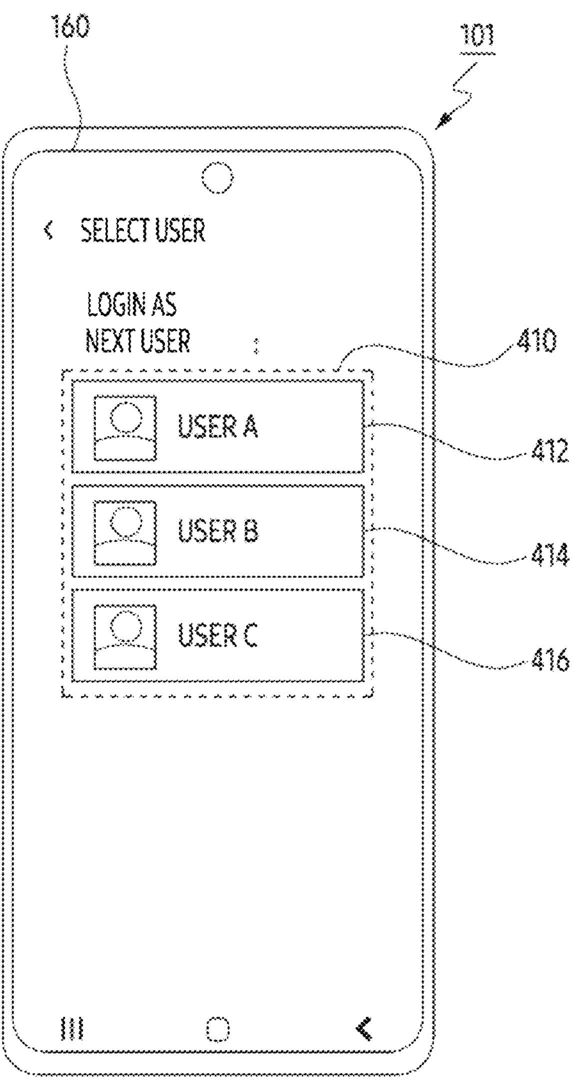
FIG. 4 illustrates an example of an operation of receiving an input indicating that an electronic device performs a mount operation regarding a portion of a plurality of areas in a storage based on authorization information, according to an embodiment.

FIG. 4 illustrates an example of an operation of receiving an input indicating that an electronic device 101 performs, or will perform, a mount operation regarding a part of a plurality of areas in a storage based on authorization information, according to an embodiment. The electronic device 101 of FIG. 4 may include the electronic device 101 of FIGS. 1 to 3. For example, the electronic device 101, the display module 160, and the storage 206 of FIG. 2 may include the electronic device 101, the display module 160, and the storage of FIG. 4.

According to an embodiment, the electronic device 101 may be personalized to each of a plurality of users. A plurality of authority information matched to each of the plurality of users may be stored in a memory (e.g., the storage 206 of FIG. 2) of the electronic device 101. Based on authority information, the electronic device 101 may identify a partition in the storage which is accessible by one user corresponding to the authority information and/or at least one area in the partition. In other words, the electronic device 101 may identify one or more partitions, areas within partitions, or other areas of the storage which are accessible to a particular user based on authority information associated with that particular user. For example, authority information may include account information of a user corresponding to the authority information. The account information may include an identifier (e.g., e-mail address) for distinguishing a user, based on a service (e.g., e-mail service, and/or application store service) provided by an external electronic device (e.g., a server) connected to the electronic device 101. For example, authority information may include a list of at least one application that is allowed to be executed by a user corresponding to the authority information among a plurality of applications installed within the electronic device 101. For example, authority information may include a list of at least one area allowed to be accessed by a user corresponding to the authority information within a specific partition (e.g., the first partition 210-1 in FIG. 2) in the storage 206 of the electronic device 101.

According to an embodiment, the electronic device 101 may display the screen of FIG. 4 in response to an input indicating that the user logged into the electronic device 101 is switched, or is to be switched. The screen of FIG. 4 may be displayed based on the execution of a designated application (e.g., a "setting application") by the electronic device 101. Within the screen of FIG. 4, a description of a visual object (e.g., the visual object of FIG. 4 corresponding to the visual object 310 of FIG. 3, and the portion of FIG. 4 corresponding to the portion 330 of FIG. 3) similar to the screen of FIG. 3 may be omitted to reduce repetition.

According to an embodiment, the electronic device 101 may display a list of one or more users registered in the electronic device 101 in a portion 410 of the screen of FIG. 4. Referring to FIG. 4, an example in which the electronic device 101 according to an embodiment displays visual objects 412, 414, and 416 corresponding to each of three users selectable by a user is illustrated. The visual objects 412, 414, and 416 may include text (e.g., name of the user) indicating each of the users registered in the electronic device 101. The visual objects 412, 414, and 416 may include at least one of an image, a video, and/or an icon indicating the users.

In an embodiment, each of the visual objects 412, 414, and 416 may correspond to different authority information. That is, different authority information may be associated with each of the visual objects 412, 414 and 416. Text and/or image displayed in each of the visual objects 412, 414, and 416 may be identified from authority information corresponding to each of the visual objects 412, 414, and 416. The visual object 412 may correspond to first authority information personalized by the first user registered in the electronic device 101. The visual object 414 may be displayed based on second authority information corresponding to the second user, registered in the electronic device 101, different from the first user. The visual object 416 may correspond to third authority information for a guest that is different from the first user and the second user and temporarily accesses the electronic device 101.

According to an embodiment, in a state of being logged in based on a specific user among a plurality of users registered in the electronic device 101, the electronic device 101 may display a list of the plurality of users, such as the screen of FIG. 4. The electronic device 101 may display the specific user logged into the electronic device 101 based on the list displayed in the portion 410. For example, the electronic device 101 may exclude the specific user logged into the electronic device 101 from the list displayed based on the portion 410. For example, the electronic device 101 may display a visual object indicating the specific user within the portion 410, based on a different shape, different size, and/or different color from other visual objects. For example, in a state in which the first user corresponding to the visual object 412 is logged into the electronic device 101, the electronic device 101 may display the visual object 412 in a color different from that of the visual objects 414 and 416.

According to an embodiment, the electronic device 101 may receive an input indicating that a user logged into the electronic device 101 is switched or is to be switched, based on the list of users displayed in the portion 410. In the state of FIG. 4 in which the first user corresponding to the visual object 412 is logged in, the electronic device 101 may identify authority information corresponding to another user selected by the input, in response to an input indicating that one of the visual objects 414 and 416 different from the visual object 412 is selected. Based on the identified authority information, the electronic device 101 may selectively perform a mounting or unmounting operation regarding a partition and/or an area in the storage.

As described above, according to an embodiment, the electronic device 101 may receive an input for partially performing a mount operation for one or more areas of the storage. The input may include an input selecting the visual object 370 of FIG. 3, and/or an input selecting any one of users, displayed in the portion 410 of FIG. 4, registered in the electronic device 101. The electronic device 101 may perform a mount operation of or for first areas designated by the authority information specified by the input among the areas of storage, and may not perform a mount operation of or for second areas different from the first areas. For example, since the mounting of the second areas is not performed, the electronic device 101 may completely block access to the second areas in a state of being driven based on the authority information. That is, when the second areas are not mounted based on the authority information associated with the user of the device in the second state, then the electronic device may block or prevent access to the second areas by the user of the device in the second state. The electronic device 101 may store data personalized to a specific user in the second areas to prevent leakage of the data.

Hereinafter, referring to FIG. 5, one or more processes executed by the electronic device 101 according to an embodiment to partially perform a mount operation of areas of storage will be described. That is, one or more processes executed by the electronic device 101 according to an embodiment to perform a mount operation for only some of the areas of the storage will be described.

Figure 5:
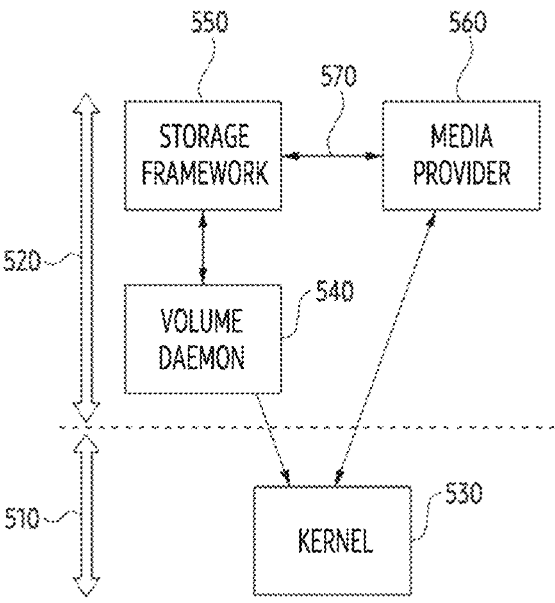
FIG. 5 illustrates an example of an application and/or a process executed by an electronic device to perform a mount operation regarding at least one of a plurality of areas in a storage, according to an embodiment.

FIG. 5 illustrates an example of an application and/or a process executed by an electronic device to perform a mount operation regarding at least one of a plurality of areas in a storage, according to an embodiment. The electronic device of FIG. 5 may include the electronic device 101 of FIGS. 1 to 4. For example, the electronic device 101 of FIG. 2 may include the electronic device of FIG. 5. Referring to FIG. 5, according to an embodiment, an example of a block diagram illustrating different processes executed by a processor of an electronic device (e.g., the processor 120 of FIGS. 1 to 2) is illustrated. The process is a unit of function and/or operation executed by the processor, and may be referred to as an instance, and/or a thread. The process may be generated based on a program classified into at least one of an operating system (e.g., the operating system 142 in FIG. 1), middleware (e.g., the middleware 144 in FIG. 1), and/or an application (e.g., the application 146 in FIG. 1). Referring to FIG. 5, a kernel 530, a volume daemon 540, a storage framework 550, and a media provider 560 that are processes executed by a processor of an electronic device are illustrated. The kernel 530 may be executed based on the kernel space 510, and the volume daemon 540, the storage framework 550 and the media provider 560 may be executed based on a user space 520. But the embodiments are not limited thereto.

Hereinafter, an example of an operation in which the electronic device performs a mount operation based on a filesystem in userspace (FUSE) will be described. Operation of FIG. 5 may be performed while the electronic device is booting, or may be performed in a state of partially performing a mount operation of areas in the storage (e.g., the storage 206 of FIG. 2), that is performing a mount operation on only some of the areas of the storage, based on the authority information, such as when the device is in a repair mode. The state may include a state in which an input selecting the visual object 370 of FIG. 3 and/or an input indicating that the user is switched based on the portion 410 of FIG. 4 is received. The embodiment is not limited to the operation of FIG. 5 and an operation based on the FUSE of FIG. 5 may be similarly performed, in a file system where partitions and/or areas of storage are set to be accessible by different users and/or applications.

According to an embodiment, the electronic device may identify an area in the storage to perform a mount operation based on an execution of the volume daemon 540. The electronic device may identify at least one area in which a mount operation will be performed among areas formed in the storage, based on any one of a plurality of authority information. For example, the electronic device may identify at least one area in which mounting will be performed based on authority information selected by the above-described input with reference to FIGS. 3 to 4. The electronic device may perform a mount operation regarding at least one area in the storage based on the execution of the volume daemon 540. Performing a mount operation based on the execution of the volume daemon 540 by the electronic device may include generating a directory name to be assigned to the at least one area to be mounted.

According to an embodiment, the electronic device may execute the storage framework 550 based on a result of performing a mount operation regarding at least one area in the storage based on the execution of the volume daemon 540. For example, the electronic device may input a result of performing a mount operation to the storage framework 550. Based on the execution of the storage framework 550, the electronic device may manage a session, which is a logical connection between the storage and authority information used in the mounting process based on the volume daemon 540. The storage framework 550 may include a system service (e.g., a storage manager service) for managing the session, a system service (e.g., a storage session controller) for controlling the session, and/or a system service (e.g., a storage user connection) for connecting the session and the user.

According to an embodiment, the electronic device may input information on at least one area in the storage in which the mounting operation is performed by the volume daemon 540 based on the execution of the storage framework 550 to the media provider 560. In order to input the information to the media provider 560, the electronic device may establish a connection 570 between the media provider 560 and the storage framework 550. The media provider 560 may establish a direct connection between the kernel 530 and the media provider 560 based on the information input through the connection 570. According to an embodiment, the electronic device may control access to the storage based on an application executed by the electronic device, based on the execution of the media provider 560.

For example, the electronic device may identify an event for accessing one area of storage generated by the application, based on the media provider 560. Based on identifying the event, the media provider 560 may identify authenticity information assigned to the application corresponding to the event, based on the information provided from the storage framework 550 through the connection 570. For example, the electronic device may identify the authority information assigned to the application by identifying an identifier included in the identifier of the process executed by the application and uniquely assigned to the authority information. In case that one area of the storage identified by the event is an area where access by the identified authority information is allowed, the electronic device may control the kernel 530 based on the media provider 560 to access one area of the storage and/or at least one file stored within the area.

Although an operation of the electronic device based on the media provider 560 has been described, an operation similar to the operation of the media provider 560 may also be performed for other system services (e.g., an app fuse) that control access between the application and storage based on the FUSE file system. For example, the media provider 560 and/or the app fuse may be a designated process for controlling access to the storage based on an application executed by a processor of an electronic device.

According to an embodiment, the electronic device may establish the connection 570 between the media provider 560 and the storage framework 550 based on the second authority information (e.g., authority information on sub-users) that is different from the first authority information (e.g., authority information on owner users) accessible to all areas in the storage of the electronic device. Since the electronic device establishes the connection 570 based on the second authority information, establishing the connection 570 based on the first authority information may be bypassed. For example, the electronic device may perform a mount operation based on the second authority information independently of establishing the connection 570 based on the performing of a mount operation based on the first authority information. That is, the electronic device may perform a mounting operation or process based on the second authority information without establishing the connection 570 based on performing a mount operation based on the first authority information. That is, the device may perform a mounting operation or process based on the second authority information without first performing a mounting operation or process based on the first authority information. Since the electronic device performs a mount operation based on the second authority information without the mounting operation based on the first authority information, the electronic device may block or prevent performing the mounting operation for partitions and/or areas that are different from the one or more partitions and/or areas within the storage specified by the second authority information. That is, the electronic device may not perform the mounting operation for partitions and/or areas which are not the partitions and/or areas within the storage specified, allocated, or corresponding to the second authority information. That is, partitions and/or areas within the storage which are not associated with or do not correspond to the second authority information may not be mounted.

According to an embodiment, the electronic device may exclusively perform a mount operation of a portion of the areas of the storage specified by the second authority information among all of the areas of the storage, by adjusting the dependency between the first authority information accessible to all areas in the storage and the second authority information that is different from the first authority information and does not allow access to all of the areas of the storage. For example, the electronic device may input a result of performing a mount operation regarding a portion of the areas in the storage, based on the second authority information to the media provider 560 and/or the app fuse by establishing the connection 570 based on the second authority information. Since the connection 570 is established independently of mounting all of the above areas based on the first authority information, the electronic device may selectively perform the mount operation regarding the portion of the areas specified by the second authority information, without performing the mount operation for all of the areas.

As described above, according to an embodiment, the electronic device may perform a mount operation based on the second authority information corresponding to the sub-user independently of the first authority information corresponding to the owner user. The mounting operation regarding at least one first area selected by the second authority information may be preferentially performed, among a plurality of areas formed in the storage, based on the performing of a mount operation based on the second authority information. Since the mounting operation regarding the at least one first area selected by the second authority information is selectively performed, the mounting operation regarding at least one second area different from the at least one first area may not be performed, among the plurality of areas in the storage. That is, at least one first area which is designated, selected or corresponding to the second authority information may be selectively mounted, and at least one second area different from the at least one first area may not be mounted, wherein the at least one first area and the at least one second area are areas from among the plurality of areas in the storage. Since the mounting operation regarding, in relation to, for or of the at least one second area is not performed, the electronic device may fundamentally block access to the at least one second area. Since access to the at least one second area is fundamentally blocked, the electronic device may block access to data (e.g., data related to privacy) stored in the at least one second area, in a state in which the mounting operation is performed based on the second authority information.

Hereinafter, referring to FIGS. 6A to 6B, in each of the states where the mounting operation or process is performed based on different authority information, an example of an operation in which an electronic device according to an embodiment provides a user with a list of directories performed in the mounting operation by the electronic device will be described. That is, an example of an operation in which an electronic device according to an embodiment provides a user with a list of directories mounted during the mounting operation by the electronic device will be described.

Figure 6A:
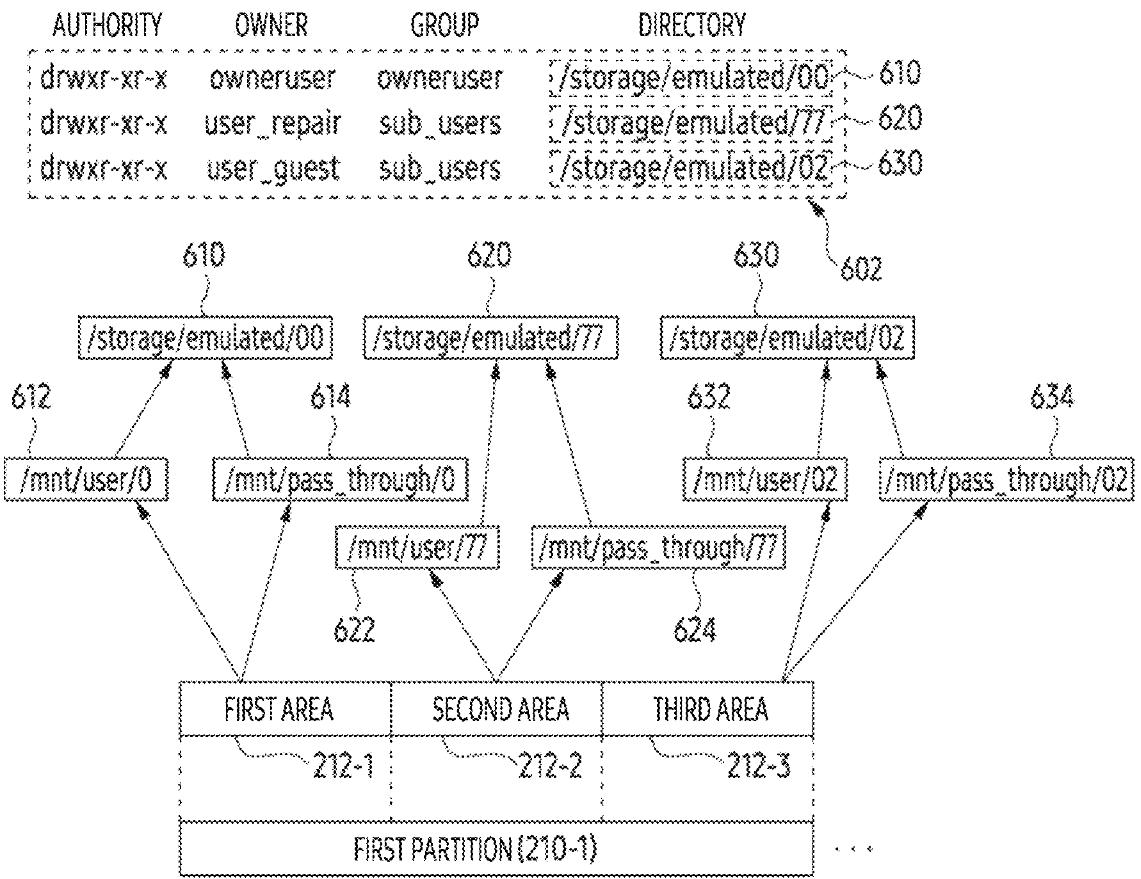
FIGS. 6A to 6B illustrate an example of an operation in which an electronic device performs a mount operation regarding at least one of a plurality of areas in a storage based on authority information, according to an embodiment.
Figure 6B:
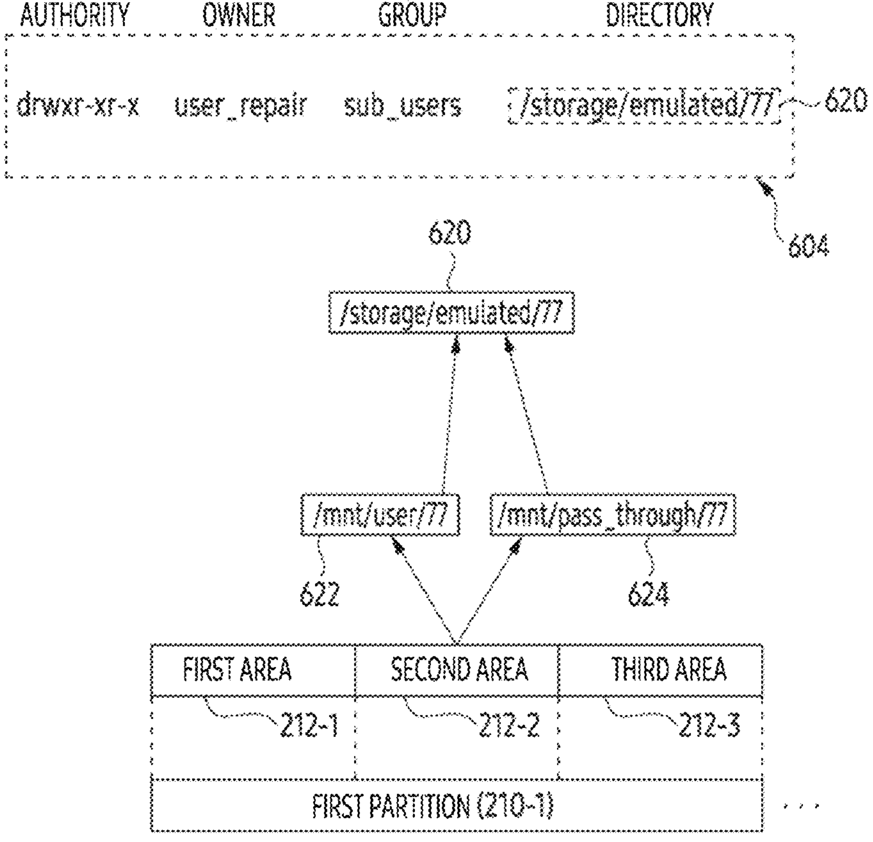

FIGS. 6A to 6B illustrate an example of an operation in which an electronic device performs a mounting operation or process regarding at least one of a plurality of areas in a storage based on authority information, according to an embodiment. The electronic devices of FIGS. 6A to 6B may include the electronic devices of FIGS. 1 to 5. For example, the electronic device 101 and the storage 206 of FIG. 2 may include the electronic devices and the storage of FIGS. 6A to 6B. For example, the first partition 210-1 and areas (e.g., first area 212-1 to third area 212-3) of FIGS. 6A to 6B may correspond to the first partition 210-1 and areas (e.g., first area 212-1 to third area 212-3) of FIG. 2.

According to an embodiment, the electronic device may selectively perform a mount operation regarding each of a plurality of areas in the storage, based on the authority information corresponding to the state of the electronic device among a plurality of authority information. For example, in the above-described normal state with reference to FIG. 3, the electronic device may perform a mounting operation regarding all of the areas based on the first authority information accessible to all of the areas in the storage. That is, all of the areas of the storage may be mounted based on the first authority information indicating that all of the areas of the storage are accessible. Referring to FIG. 6A, according to an embodiment, an example in which the electronic device performs a mount operation regarding all of the areas of the storage based on the first authority information is illustrated. Referring to FIG. 6B, according to an embodiment, an example in which the electronic device performs a mount operation regarding a portion of the areas of the storage based on the second authority information different from the first authority information is illustrated.

Referring to FIG. 6A, according to an embodiment, the electronic device may perform a mounting operation regarding all of the first area 212-1 to the third area 212-3 formed within the first partition 210-1. That is, all of the first area 212-1, the second area 212-2 and the third area 212-3 formed within the first partition 210-1 may be mounted by the electronic device. The first partition 210-1 may be referred to as a data partition in terms of a partition in which data provided from the user is stored. According to an embodiment, the electronic device may obtain permission information indicating accessibility of a portion of the storage from among all of the portions of the storage (e.g., a partition, and/or areas in the partition). For example, the electronic device may identify the ownership of the first area 212-1 from the permission information stored in the first area 212-1. The permission information may be used to determine whether to perform a mount operation regarding the portion of the storage in which the permission information is stored.

According to an embodiment, the permission information may indicate a partition corresponding to the permission information and/or a specific user who owns an area in the partition, based on a plurality of authority information. For example, in case that the first area 212-1 is generated by the owner user related to the first authority information, the permission information stored in the first area 212-1 may indicate that the first area 212-1 is owned by the owner user based on the identifier assigned to the first authority information. Hereinafter, it is assumed that the second area 212-2 is owned by a sub-user (e.g., a sub-user whose name "user_repair" is assigned) different from the owner user, and the third area 212-3 is owned by still another sub-user (e.g., a sub-user whose name "user_guest" is assigned).

According to an embodiment, the electronic device may determine whether to perform a mount operation regarding, in relation to, for or of the partition and/or area in which the permission information is stored, by comparing the authority information used for performing the mounting operation and the authority information indicated by the permission information. As shown in FIG. 6A, in a state that the electronic device performs a mounting operation based on the first authority information accessible to all areas in the storage, the electronic device may perform a mount operation regarding the first area 212-1 independently of the permission information in the first area 212-1. The mounting of the first area 212-1 independently of the permission information in the first area 212-1 can occur because the first authority information indicates that all of the areas in the storage are accessible, so there is no need to additionally individually check the permission information stored within or associated with each of the plurality of areas of the storage. In the state of FIG. 6A, the electronic device may also perform a mount operation regarding each of the second area 212-2 and the third area 212-3.

Referring to FIG. 6A, according to an embodiment, the electronic device may perform a mount operation regarding the first area 212-1 based on the execution of a system service based on a fuse such as a fuse mount. The electronic device may obtain a directory name 612 (e.g., "/mnt/user/0") for the first area 212-1 based on the fuse mount. The electronic device may obtain a directory name 614 (e.g., "/mnt/pass_through/0") for the first area 212-1 based on the execution of another system service based on a fuse, such as a fuse bind mount. The electronic device may assign a directory name 610 (e.g., "/storage/emulated/00") to the first area 212-1 indicated by the directory names 612 and 614, based on a symbolic link. The symbolic link may mean a file and/or a directory for accessing the specific directory, based on a directory name (e.g., relatively short text) that is different from the directory name of a specific directory (e.g., directory with relatively long text assigned), such as a shortcut within a directory. For example, directory names 610, 612, and 614 may be used by a process and/or a user to access the first area 212-1. For example, the directory name 610 may be used to access the first area 212-1 by processes, applications, and/or users who have accessed the electronic device.

Referring to FIG. 6A, the electronic device may obtain directory names 620, 622, and 624 by performing a mount operation regarding the second area 212-2. The directory name 622 may be obtained based on the execution of a fuse mount. The directory name 624 may be obtained based on the execution of a fuse bind mount. The directory name 620 may be a symbolic link to at least one of directory names 622 and 624. Similar to the first area 212-1 and the second area 212-2, the electronic device may perform a mount operation regarding the third area 212-3 to obtain directory names 630, 632, and 634. Each of the directory names 632 and 634 may be assigned to the third area 212-3 based on the execution of the fuse mount and the fuse bind mount by the electronic device. The directory name 630 may be a symbolic link to the third area 212-3 and/or directory names 632 and 634. The directory names 610, 620, and 630 may indicate that access to the first area 212-1 to the third area 212-3 by different processes driven by the electronic device is possible.

As described above with reference to FIG. 6A, according to an embodiment, the electronic device may perform a mount operation regarding all of the first area 212-1 to the third area 212-3, based on the first authority information (e.g., authority information for owner users) accessible to all areas in the storage. Referring to FIG. 6A, according to an embodiment, a portion of the list 602 of the directory names displayed by the electronic device is illustrated. The electronic device may display a list 602 in response to a command for visualizing a directory (e.g., a shell command such as "ls-all").

Referring to the list 602 of FIG. 6A, according to an embodiment, the electronic device may display at least a portion of the permission information corresponding to each of the areas, together with directory names 610, 620, 630 assigned to each of the first area 212-1, the second area 212-2, and the third area 212-3. For example, the electronic device may display a text indicating a user indicated as possessing the area based on the permission information, in the owner column in the list 602. Referring to FIG. 6A, the electronic device may display a text (e.g., "owneruser") indicating the owner user identified as the owner of the first area 212-1 by the permission information in the first area 212-1, together with the directory name 610 of the first area 212-1. The electronic device may display text (e.g., "user_repair") indicating the owner of the second area 212-2 identified by the permission information for the second area 212-2, together with the directory name 620 of the second area 212-2. The electronic device may display text (e.g., "user_guest") identified by the permission information of the third area 212-3 and indicating the owner of the third area 212-3, together with the directory name 630 of the third area 212-3.

According to an embodiment, the electronic device may further display a group including the owner in another column (e.g., a group column) adjacent to the owner column in the list 602. The group may include a group in which users corresponding to each of the authority information are classified. Referring to FIG. 6A, the electronic device may display the name assigned to the group in the list 602, together with the directory name 620 corresponding to the second area 212-2 and the directory name 630 corresponding to the third area 212-3, based on identifying that the first sub-user who is the owner of the second area 212-2 and the second sub-user who is the owner of the third area 212-3 are included in the matched group (e.g., the name "sub_users").

According to an embodiment, the electronic device may display the types of areas and the accessibility of the areas corresponding to each of the directory names 610, 620, and 630, based on the permission information, through the authority column of the list 602. For example, the permission information may include one or more flags indicating whether at least one of reading, writing, or access to the one area corresponding to the permission information is allowed to a first user who owns an area of storage corresponding to the permission information, a group including the first user, and at least one second user distinct from the user group. The authority column in the list 602 may include at least one character based on the one or more flags. For example, "r" may indicate that read is allowed, "w" may indicate that write is allowed, and "x" may indicate that file execution or directory access is allowed.

Referring to FIG. 6A, the text (e.g., "drwxr-xr-x") displayed through the authority column corresponding to the directory name 610 assigned to the first area 212-1 may include a character (e.g., "d") indicating that the entity (e.g., the directory name 610) in the list 602 corresponding to the text is a directory. The text (e.g., "rwx") between the second letter and the fourth letter of the above text (e.g., "drwxr-xr-x") corresponding to the directory name 610 may indicate that the user (e.g., owner user) who owns the first area 212-1 is allowed to read, write, and access. The text (e.g., "r-x") between the fifth letter and seventh letter of the above text (e.g., "drwxr-xr-x") corresponding to the directory name 610 may indicate that another user included in the group of the user who own the first area 212-1 are allowed to read, access, and are prohibited from writing. The text (e.g., "r-x") between the eighth letter and the tenth letter of the above text (e.g., "drwxr-xr-x") corresponding to the directory name 610 may indicate that other users different from the group of users who own the first area 212-1 are allowed to read, access, and are prohibited from writing.

Referring to FIG. 6A, when the electronic device is booted up by performing a first mounting operation based on a first authority information, an operation accessing to a memory may be controlled based on a first list of directory names associated with storage areas of the memory. In an embodiment, when the electronic device is booted up by performing a second mounting operation based on a second authority information different from the first authority information, the operation accessing to the memory may be controlled based on a second list of a portion of the directory names associated with a portion of the storage areas. The second list may correspond to a portion of the first list.

According to an embodiment, as shown in FIG. 6A, the electronic device may selectively execute performing a mounting operation of all areas in the storage based on the first authority information for the owner user and performing a mounting operation regarding a portion of the areas in the storage based on the second authority information for the sub-user. That is, an electronic device may perform a mounting operation for all of the areas in the storage when the authority information corresponds to the authority information for the owner user, and may perform a mounting operation for a portion of the areas in the storage when the authority information corresponds to the second authority information relating to a sub-user. Referring to FIG. 6B, according to an embodiment, an example of a state in which the electronic device performs a mount operation based on the second authority information different from the first authority information is illustrated. Hereinafter, it is assumed that the second authority information corresponds to a sub-user (e.g., a sub-user assigned identifier "user_repair") who is the owner of the second area 212-2. For example, the second authority information may be stored in the electronic device for a specific user accessing the electronic device for limited purposes (e.g., repair). The specific user may trigger that the electronic device performs a mount operation based on the second authority information, based on the above-described input with reference to FIGS. 3 to 4. That is, identifying the sub-user as the user of the device may cause the electronic device to perform a mount operation based on the second authority information corresponding to the sub-user, based on the above-described input with reference to FIGS. 3 to 4.

According to an embodiment, in a state in which a mount operation is performed based on the second authority information different from the first authority information, the electronic device may compare the owner of the specific area identified by the permission information stored in the specific area, and the user indicated by the second authority information. The electronic device may determine whether to perform a mount operation regarding the specific area based on a result of comparing the owner and the user. For example, the electronic device may bypass or stop the performing of a mount operation regarding the first area 212-1, based on identifying that the owner (e.g., owner user) of the first area 212-1 and the user (e.g., sub-user) indicated by the second authority information are different. For example, the electronic device may omit to assign a directory name (e.g., directory names 630, 632, and 634) indicating the third area 212-3 when performing a mount operation regarding the third area 212-3, based on identifying that the owner of the third area 212-3 is another sub-user different from the sub-user indicated by the second authority information. That is, when a mounting operation or process is being performed in relation to a first sub-user of an electronic device, the electronic device may not assign a directory name to a third area 212-3 based on identifying that the owner of the third area is a second sub-user different to the first sub-user. Identifying that the owner of the third area is a second sub-user different to the first sub-user may be based on the second authority information associated with the first sub-user in respect to the third area 212-3.

Referring to FIG. 6B, in a state in which a mount operation is performed based on the second authority information, the electronic device may selectively perform a mounting operation regarding the second area 212-2 owned by the sub-user indicated by the second authority information. Since the mounting operation regarding the second area 212-2 is selectively performed, the electronic device may obtain at least one directory name (e.g., directory names 620, 622, and 624) indicating the second area 212-2. In an embodiment of FIG. 6B, since the owner of the first area 212-1 is different from the user indicated by the second authority information, the electronic device may not perform a mounting operation regarding the first area 212-1. For example, the directory names 610, 612, and 614 of FIG. 6A may not be assigned to the first area 212-1 in the state of FIG. 6B. Similarly, the directory names 630, 632, and 634 of FIG. 6A may not be assigned to the third area 212-3 in the state of FIG. 6B. In other words, the electronic device may obtain at least one directory name for an area of the storage which is selectively mounted, and may not obtain a directory name in relation to an area of the storage which is not selectively mounted. An area of the storage may be selectively mounted if the area is determined to be owned by the user indicated by the authority information, and may not be selectively mounted if the area is determined to be owned by a user different to the user indicated by the authority information. That is, the area of the storage may not be selectively mounted if the owner of the storage is not the same as the user indicated by the authority information. When the area of the storage is not selectively mounted, a directory name for the area of the storage may not be obtained.

Referring to FIG. 6B, according to an embodiment, at least a portion of the list 604 of directory names displayed by the electronic device in the state of FIG. 6B is illustrated. Similarly as described above with reference to FIG. 6A, the electronic device may display the list 604 based on a command for displaying the list 604 of directory names generated based on the performing of the mount operation. Referring to FIG. 6B, according to an embodiment, in a state in which the electronic device performs a mount operation based on the second authority information that is different from the first authority information for the owner user, a mounting operation regarding a specific area (e.g., the second area 212-2) owned by the user (e.g., a sub-user assigned the name "user_repair") indicated by the second authority information may be selectively performed. For example, a mounting operation of other areas (e.g., the first area 212-1 and/or the third area 212-3) that are not owned by the user indicated by the second authority information may not be performed, among the areas in the first partition 210-1. That is, areas that are not owned by the user indicated by the second authority information may not be mounted. Since the mounting of the other area is not performed, the directory name assigned to the other area may not be displayed in the list 604. In the state of FIG. 6B, since any directory name is not assigned to the other area, an operation of accessing the other area (e.g., the first area 212-1 and/or the third area 212-3) not owned by the user indicated by the second authority information based on a process executed by the electronic device may not be performed. That is, the user indicated by the second authority information cannot access an area owned by another user because the area owned by the another user is not mounted, so does not have a directory name assigned to it, and so is not displayed in the list 604 of directory names.

As described above, according to an embodiment, in a state of performing a mount operation based on the second authority information different from the first authority information for the owner user, the electronic device may identify at least one first area owned by a user corresponding to the second authority information among the areas based on permission information of areas formed in the storage. That is, the electronic device may identify at least one first area owned by the sub-user corresponding to the second authority information. The at least one first area may be identified from among all of the areas of the storage. The at least one first area may be identified based on the permission information of each of the areas formed in the storage. The electronic device may obtain the at least one directory name assigned to the at least one first area, by performing a mount operation regarding the at least one first area among at least one first area and at least one second area different from the at least one first area. That is, the electronic device may perform a mounting operation for the at least one first area, and may not perform a mounting operation for the at least one second area, wherein the at least one second area is different to the at least one first area. For example, any directory name may not be assigned to the at least one second area. A directory name may not be assigned to the at least one second area because the at least one second area is not mounted, that is, the at least one second area has not undergone a mounting operation. The electronic device may fundamentally block an operation of accessing the at least one second area based on not assigning a directory name to the at least one second area. Since the at least one second area stores data provided from the owner user or a user other than the user indicated by the second authority information, the electronic device may protect the privacy of the owner user or the other user by blocking the operation of accessing the at least one second area by the user corresponding to the second authority information. For example, the at least one first area is an area in which a technician's access to repair an electronic device is allowed, and log information (e.g., execution history of software applications, error history and/or interrupt history occurred in the electronic device, and/or event history occurred in the electronic device) executed in the electronic device may be stored, wherein the technician corresponds to a sub-user corresponding to the second authority information. The technician may access the at least one first area because the permissions of the at least one first area indicates that the sub-user corresponding to the second authority information is allowed to access the at least one first area, and so the at least one first area is mounted. Since the at least one first area is mounted, a directory name is assigned to the at least one first area, so the technician may use the assigned directory name to access the at least one first area. The technician cannot access the at least one second area, different to the at least one first area, because the permissions of the at least one second area do not indicate that the sub-user corresponding to the second authority information is allowed to access the at least one second area. The at least one second area is therefore not mounted, so a directory name is not assigned to the at least one second area, and the technician is unable to access the at least one second area.

Hereinafter, referring to FIGS. 7 to 8, an operation of the electronic device according to an embodiment will be described.

Figure 7:
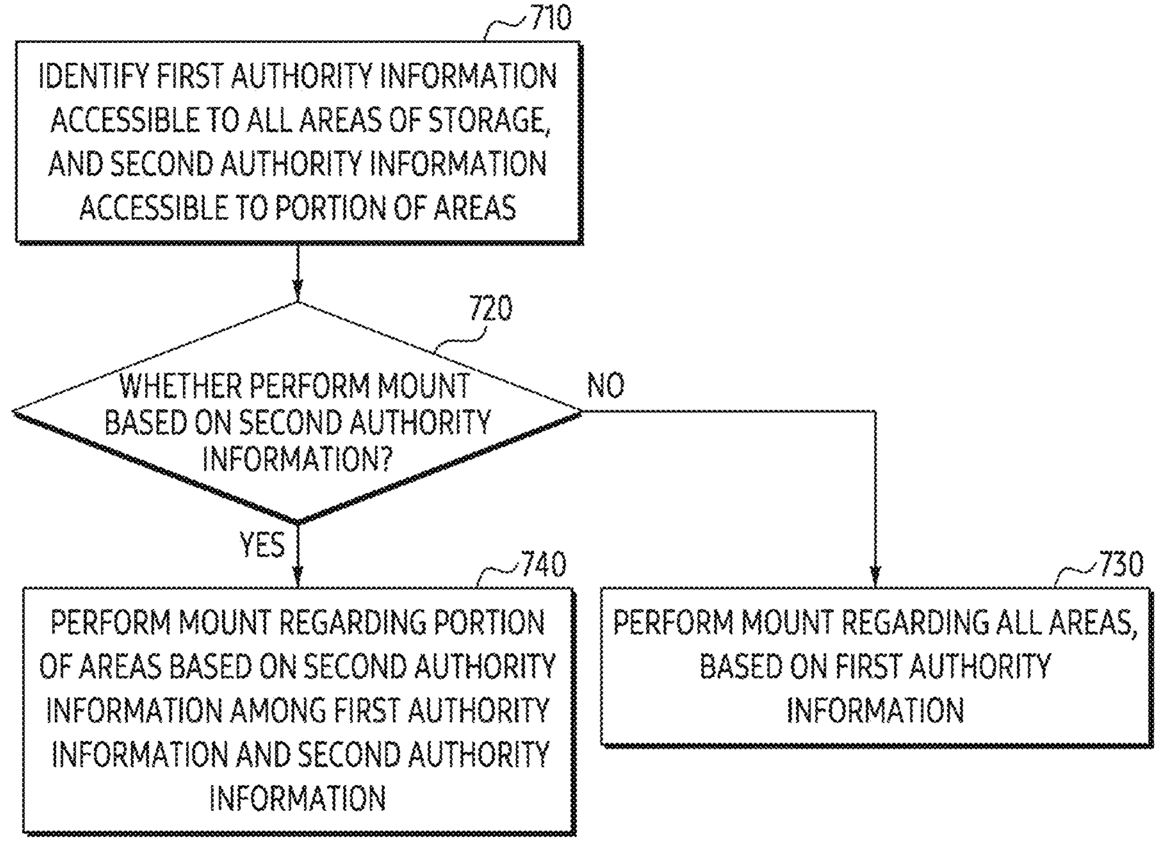
FIG. 7 illustrates an example of an operation of an electronic device according to an embodiment.

FIG. 7 illustrates an example of an operation of an electronic device according to an embodiment. The electronic device of FIG. 7 may be an example of the electronic device of FIGS. 1 to 5, and/or the electronic device of FIGS. 6A to 6B. At least one of the operations of FIG. 7 may be performed by the electronic device 101 and/or the processor 120 of FIG. 2.

Referring to FIG. 7, according to an embodiment, in operation 710, the electronic device may identify first authority information accessible to all areas of the storage, and second authority information accessible to a portion of the areas of the storage. The storage may include the storage 206 of FIG. 2. The first authority information may correspond to a designated user among users registered in an electronic device, such as the owner user. The second authority information may correspond to a sub-user different from the owner user. The sub-user may be another user of the electronic device, different to the owner user. The sub-user may be a technician or other user designated to repair, upgrade or maintain the electronic device. A plurality of authority information including the first authority information and the second authority information may be stored in a specific partition managed by the operating system of the electronic device within the storage of the electronic device.

Referring to FIG. 7, according to an embodiment, in operation 720, the electronic device may identify whether to perform a mount operation based on the second authority information. For example, the electronic device may identify whether an input indicating the performing of a mount operation based on the second authority information among the first authority information and the second authority information of operation 710 is received. The input may be received based on the visual object 370 of FIG. 3. The input may be received based on a gesture of selecting a sub-user from among a plurality of users registered in the electronic device based on the portion 410 of FIG. 4.

In operation 730, in case that the mount operation is not performed based on the second authority information (720—NO), the electronic device according to an embodiment may perform a mount operation regarding all areas based on the first authority information. That is, when the mount operation is not performed based on the second authority information, the mount operation may instead be performed based on the first authority information. When the mount operation is performed based on the first authority information, all of the areas of the storage may be mounted. The electronic device may assign different directory names to each of the areas in the storage, based on the execution of the volume daemon 540 of FIG. 5. The state of FIG. 6A may be an example of a state in which the electronic device performs a mount operation based on operation 730. In a state in which the electronic device has performed a mount operation based on operation 730, directory names may be assigned to all of the areas in the storage. In a state that a mount operation is performed regarding all of the areas based on operation 730, the electronic device may additionally perform a mount operation based on the second authority information different from the first authority information. That is, when the electronic device performs a mount operation based on the first authority information, the electronic device may also perform a mount operation based on the second authority information. That is, when the electronic device performs a mount operation for a user corresponding to the owner user of the device, the electronic device may mount all of the areas of the storage of the device such that the areas of storage belonging to or owned by each of the one or more sub-users (corresponding to the second authority information) are mounted in addition to the areas of storage belonging to the owner user (corresponding to the first authority information). That is, the owner user may access all of the areas of storage on the electronic device, regardless of to which user or sub-user the areas of the storage belong.

In operation 740, in a state that a mounting operation is performed based on the second authority information (720—YES), the electronic device according to an embodiment may perform a mounting operation regarding a portion of the areas of the storage based on the second authority information among the first authority information and the second authority information. That is, the electronic device may perform a mounting operation for the areas of the storage based on or corresponding to the second authority information, and may not perform a mounting areas for the areas of the storage based on or corresponding to the first authority information. Based on the volume daemon 540 of FIG. 5, the electronic device may obtain at least one directory name to be assigned to at least one area related to the second authority information among all of the areas in the storage. That is, the electronic device may obtain at least one directory name to be assigned to the at least one mounted areas of the storage, and may not obtain at least one directory name for the at least one areas of the storage which are not mounted. The electronic device may input the result of obtaining the at least one directory name to the media provider 560 by establishing a connection 570 between the storage framework 550 and the media provider 560 of FIG. 5. Since the electronic device obtains the at least one directory name to be assigned to the at least one mounted area related to the second authority information, assigning a directory name to another area different from the at least one area among the areas in the storage may be stopped. In other words, a directory name may not be assigned to the at least one areas in the storage which are not mounted. For example, the electronic device may bypass performing a mount operation based on the first authority information. That is, the electronic device may not perform a mount operation based on the first authority information. In other words, the electronic device may not perform a mount operation for the areas of the storage which are associated with the owner user corresponding to the first authority information based on the permissions of the areas of the storage. For example, the electronic device may refrain from assigning a directory name to the other areas of the storage which are not mounted. That is, the electronic device may not assign a directory name to the areas of the storage associated with the first authority information corresponding to the owner user. In this way, the at least one area of the storage related to the second authority information may be mounted and, since a directory name may be assigned to the mounted at least one area of the storage, the mounted at least one area of the storage may be accessible to the sub-user associated with the second authority information. In contrast, the at least one area of the storage which is not related to the second authority information, and which may instead be related to the first authority information, may not be mounted. Since a directory name may not be assigned to the at least one area of the storage which are not mounted, the non-mounted at least one area of the storage may not be accessible to the sub-user associated with the second authority information The state of FIG. 6B may be an example of a state in which the electronic device performs a mount operation based on operation 740.

Figure 8:
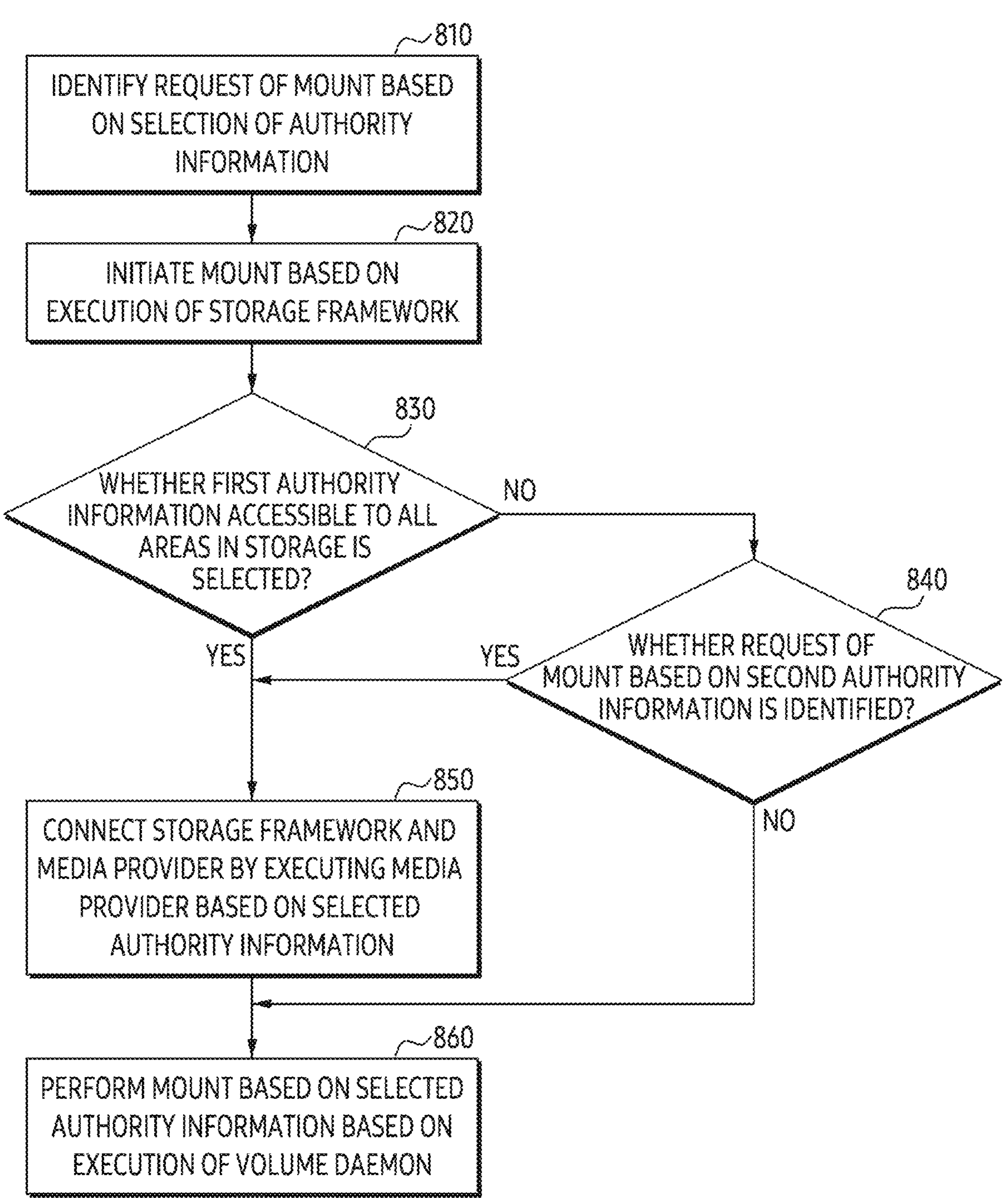
FIG. 8 illustrates an example of an operation of an electronic device according to an embodiment.

FIG. 8 illustrates an example of an operation of an electronic device according to an embodiment. The electronic device of FIG. 8 may be an example of the electronic device of FIGS. 1 to 7. At least one of the operations of FIG. 8 may be performed by the electronic device 101 and/or the processor 120 of FIG. 2. At least one of the operations of FIG. 8 may be related to at least one of the operations of FIG. 7.

Referring to FIG. 8, in operation 810, the electronic device according to an embodiment may identify a request for performing a mounting operation based on a selection of authority information. That is, the electronic device may identify a request for mounting one or more areas of a storage based on an input selecting authority information associated with a user or sub-user of the device. In other words, the electronic device may detect a selection of one of a first or second authority information, and identify a request for mounting one or more areas of the storage based on the detected selection of the first or second authority information. According to an embodiment, the electronic device may receive an input for selecting any one of the authority information (e.g., authority information including the first authority information and the second authority information of operation 710 of FIG. 7). The electronic device may receive an input for performing booting and/or rebooting based on one authority information among the authority information. Based on the input, the electronic device may identify a request for performing a mounting operation based on the selection of the authority information.

Referring to FIG. 8, in operation 820, the electronic device according to an embodiment may initiate a mounting operation based on the execution of the storage framework. The storage framework may include the storage framework 550 of FIG. 5. The electronic device may perform a mount operation based on the authority information selected by the request of operation 810 based on the execution of the volume daemon 540 and the storage framework 550.

Referring to FIG. 8, in operation 830, the electronic device according to an embodiment may identify whether the first authority information accessible to all areas in the storage is selected. That is, the electronic device may identify whether the first authority information, which allows or authorizes access to all of the areas of the storage, is selected. For example, the electronic device may determine whether the request in operation 810 is a request for performing a mount operation based on the first authority information indicating the owner user among a plurality of authority information stored in the electronic device. In operation 840, when the first authority information is not selected (830—NO), the electronic device according to an embodiment may determine whether a request for performing a mounting operation or process based on the second authority information different from the first authority information is identified. The request of mount based on the second authority information may be identified based on an input indicating that the repair mode is entered. For example, a request for performing a mount operation based on the repair mode may be received based on an input indicating that the visual object 370 of FIG. 3 is selected.

In operation 850, when it is identified that the first authority information is selected by the request for performing a mounting operation 810 (830—YES), or when the request for performing a mount operation based on the second authority information different from the first authority information is identified (840—YES) such as the repair mode, the electronic device according to an embodiment may connect a storage framework and a media provider by executing the media provider based on the selected authority information. The media provider may include the media provider 560 of FIG. 5. For example, the electronic device may establish a connection 570 between the media provider 560 of FIG. 5 and the storage framework 550 based on operation 850.

Referring to FIG. 8, in operation 860, the electronic device according to an embodiment may perform a mount operation based on the selected authority information based on the execution of the volume daemon. The volume daemon of operation 860 may include the volume daemon 540 of FIG. 5. The electronic device may input at least one directory name obtained using the volume daemon 540 and the storage framework 550 of FIG. 5 to the media provider 560, based on the connection 570 of FIG. 5 established based on operation 850. The at least one directory name may indicate at least one area accessible by the authority information selected by the request of operation 810.

Referring to FIG. 8, when the first authority information is not selected (830-NO) by the request of operation 810, and the request for performing a mount operation based on the second authority information (such as the repair mode) different from the first authority information is not identified (840—NO), the connection between the storage framework and the media provider based on operation 850 may be bypassed. For example, when a request for performing a mount operation based on the second authority information different from the first authority information is identified after a mounting operation based on the first authority information is performed, the electronic device may bypass performing operation 850 and may use a connection (e.g., the connection 570 in FIG. 5) between the storage framework and the media provider established by performing a mount operation based on the first authority information.

Figure 9A:
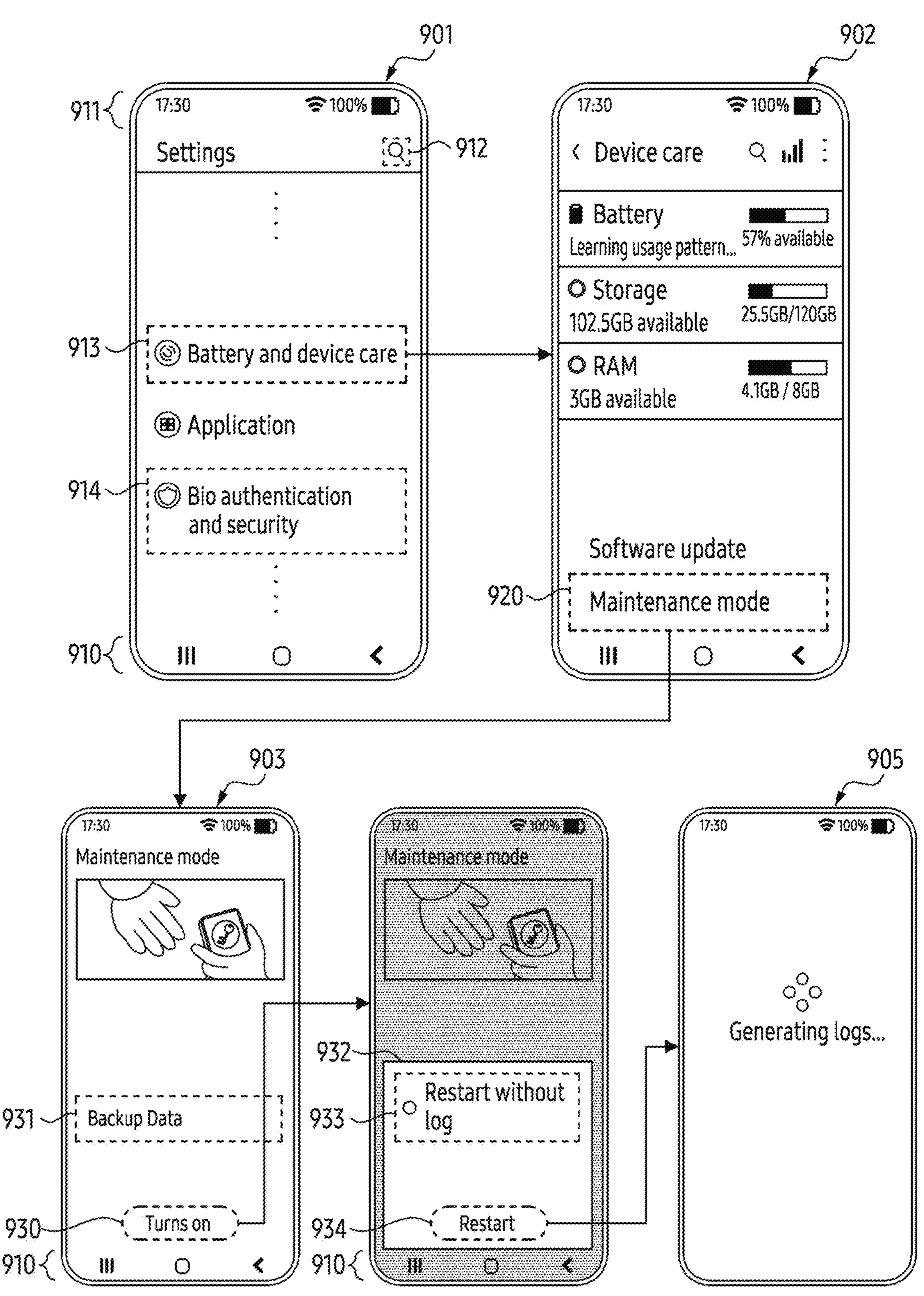
FIGS. 9A to 9B illustrates examples of screens displayed by an electronic device for receiving an input associated with mounting operation according to an embodiment.
Figure 9B:
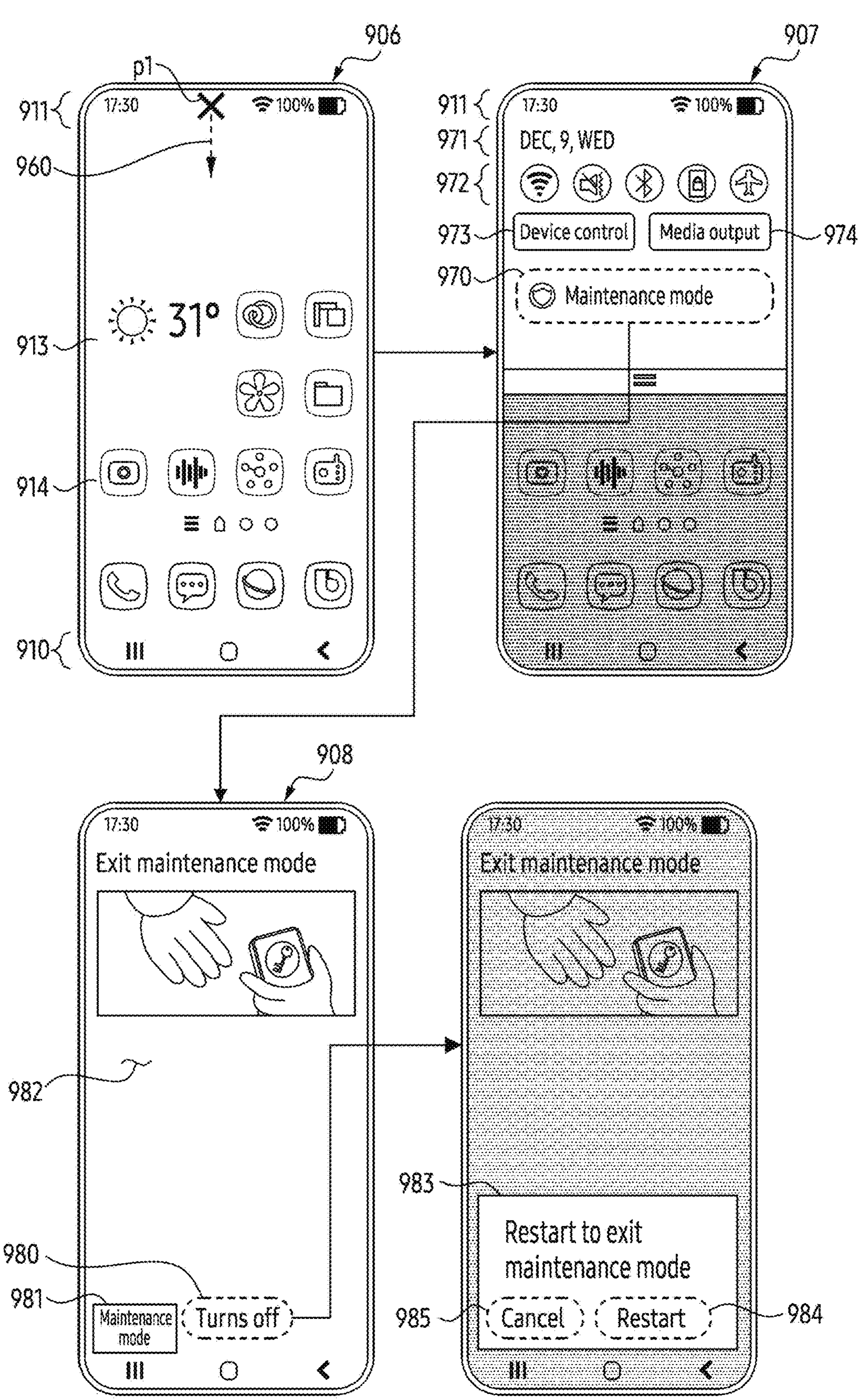

FIGS. 9A to 9B illustrates screens displayed by an electronic device for receiving an input associated with a mounting operation. The electronic device of FIGS. 9A to 9B may comprise the electronic device 101 of FIG. 1 to FIG. 8. For example, the electronic device 101 of FIG. 2 may display screens 901, 902, 903, 905, 906, 907, 907 illustrated in FIGS. 9A to 9B through the display module 160.

Referring to FIG. 9A, the screens 901, 902, 903, 905 displayed by the electronic device in a first mode are illustrated. The first mode may include a mode and/or a state in which all of the storage areas of a memory (e.g., the storage 206 of FIG. 2) are mounted. For example, the electronic device may enter into the first mode by performing the first mounting operation based on a first authority information (e.g., authority information with respect to an owner-user) accessible to all of the storage areas. The first mode may be referred as a first state, normal state, normal boot-up state and/or normal mode.

Referring to FIG. 9A, the electronic device may display the screen 901 based on an execution of a preset software application (e.g., the setting application described referring to FIG. 3) for changing setting values of the electronic device. The screen 901 may include a navigation bar 910 including buttons (e.g., home button, back button, and/or multitasking button) for switching the screen 901 displayed in the display, and displayed along a bottom edge of the screen 901. In the screen 901, the electronic device may display a status bar 911 for displaying states associated with the electronic device (e.g., state of charge (SOC) of a battery, a type and/or receiving sensitivity of an wireless network, current time), and that is displayed along a top edge of the screen 901.

Referring to the exemplary screen 901, the electronic device may display a menu and/or options for adjusting setting values of the electronic device. In the screen 901, the electronic device may display a visual object 912 for searching the options. At least based on an input indicating to select the visual object 912, the electronic device may obtain a query with respect to the options. Referring to FIG. 9A, in the screen 901, the electronic device may display a visual object 913 corresponding to an option for changing setting values with respect to hardware included in the electronic device. Referring to FIG. 9A, the visual object 913 includes a text such as “battery and device care”, but embodiments are not limited thereto. In the screen 901, the electronic device may display a visual object 914 corresponding to an option for changing setting values associated with the security of the electronic device. A visual object may be referred to as an icon. A visual object is a user-selectable object that a user may select in order to view or change settings related to the option indicated by the visual object. The user may select the visual object by, for example, providing a touch input on the area of the screen on which the visual object is located.

In the screen 901 of FIG. 9A, in response to an input indicating a selection of the visual object 913, the electronic device may display the screen 902. That is, in response to a user input to select the visual object 913, the electronic device may display screen 902. On the screen 902, the electronic device may display the SOC of the battery included in the electronic device and/or memory usages of a volatile memory and/or a non-volatile memory of the electronic device. Through the screen 902, the electronic device may visualize states of the above-described battery, volatile memory and/or non-volatile memory. That is, the electronic device may provide visual information indicative of the states of the battery, volatile memory and/or non-volatile memory to inform the user of the states of these components. On the screen 902, the electronic device may display a visual object 920 corresponding to an option for entering a second mode different from the first mode, wherein the first mode is a current mode of the electronic device. Referring to FIG. 9A, the visual object 920 includes a text such as “maintenance mode” but embodiments are not limited thereto. In response to an input indicating to select the visual object 920, the electronic device may display the screen 903. That is, in response to a user input to select the visual object 920, the screen 903 is displayed.

In the screen 903 of the FIG. 9A, the electronic device may display an image and/or a text for describing the second mode. The second mode may include a mode and/or a state in which a portion of the storage areas of the memory is mounted and the remaining portions are not mounted. For example, the electronic device may enter into the second mode by performing the second mounting operation based on a second authority information (e.g., an authority information with respect to a sub-user) accessing the portions of the storage areas. That is, in response to receiving the second authority information, the electronic device may enter the second mode by performing the second mounting operation to mount only a portion of the storage areas of the memory, and to not mount the remaining portions of the storage areas. The portion of the storage that is mounted corresponds to the second authority information, whereas the portions of the storage that are not mounted do not correspond to the second authority information. The portions of the storage that are not mounted may only correspond to the first authority information. The second mode may be referred as a second state, a maintenance state, a restricted state, safe mode and/or a maintenance mode.

Referring to FIG. 9A, in the screen 903, the electronic device may display a visual object 931 for performing a backup of data stored in the electronic device before entering the second mode. Based on an input indicating to select the visual object 931, the electronic device may perform backup with respect to at least portion of information stored in the storage. That is, in response to receiving a user input to select the visual object 931, the electronic device may perform a backup operation to back up at least a portion of the information stored in the storage of the electronic device. The electronic device performing the backup based on the input indicating to select the visual object 931, may enter the second mode. In the screen 903, the electronic device may display a visual object 930 for entering the second mode without backup based on the visual object 931. That is, on screen 903 the electronic device may display a visual object 930 for entering the second mode without first performing a backup of at least a portion of the information stored in the storage. The visual object 930 may include text such as "Turns On", but the embodiments are not limited thereto. In response to an input indicating to select the visual object 930, the electronic device may display a pop-up window 932 superimposed on the screen 903. That is, in response to a user input indicating the selection of the visual object 930, the electronic device may display a pop-up window 932 displayed on the screen, wherein the pop-up window may be superimposed on a portion of the screen to cover the portion of the screen. In this example, the pop-up window is provided on a bottom portion of the screen and covers the visual objects 931 and 930, but the embodiments are not limited thereto.

Referring to FIG. 9A, the electronic device displaying the pop-up window 932 superimposed on the screen 903, may display text for guiding entering the second mode based on reboot in the pop-up window 932. That is, text may be displayed on the pop-up window 932 to guide a user to enter the second mode by rebooting the electronic device. In the pop-up window 932, the electronic device may display a visual object 933 for adjusting an option associated with log information. For example, by using the visual object 933 including a check box, the electronic device may identify an input for adjusting whether to generate the log information. That is, by selecting the visual object 933 to check the box, the electronic device may identify an input to restart the electronic device without generating log information. However, when the box is unchecked, the electronic device may restart and generate log information. In the pop-up window 932, the electronic device may display a visual object 934 for initiating the reboot for entering the second mode. The visual object 934 includes a text such as "Restart", but embodiments are not limited thereto. In response to an input indicating to select the visual object 934, the electronic device may perform reboot for entering the second mode. That is, in response to receiving a user input to select the visual object 934, the electronic device may perform a reboot in order to enter the second mode. The reboot may be conditionally initiated by authorizing a user of the electronic device such as biometric authorization. That is, it may be necessary to check an authorization of the user before rebooting the electronic device into the second mode. The authorization may be checked using biometric information of the user to the verify the user. For example, fingerprint information of the user may be acquired and compared with stored fingerprint information to verify the identity of the user.

Referring to FIG. 9A, in response to an input indicating to select the visual object 934, the electronic device may display the screen 905. That is, screen 905 may be displayed in response to receiving a user input indicating the selection of the visual object 934. As described above, the screen 905 may be displayed based on authorizing a user performing the input based on biometric authorization. While displaying the screen 905, the electronic device may generate and/or store log information to be provided to a user (e.g., a technician) of the electronic device after entering the second mode. Based on storing the log information, the electronic device may cease to display the screen 905 and may perform a reboot. The reboot may include an operation of turning off the electronic device and then turning on the electronic device again. While turning the electronic device off, the electronic device may disassociate storage areas and directory names based on an unmounting operation. That is, the electronic device may perform an unmounting operation to disassociate storage areas and directory names. While turning the electronic device on, the electronic device may associate a portion of the storage areas and a portion of the directory names based on a second mounting operation. That is, when turning the electronic device on, a second mounting operation may be performed to associate one or more portions of the storage areas with their corresponding directory names so that these associated one or more storage portions are mounted. The mounted storage portions may be accessible to a user of the electronic device when the electronic device is operating in accordance with the second mounting operation. The second mounting operation may be performed based on a second authority information corresponding to the second mode. By performing the second mounting operation, the remaining portion of the storage areas and the remaining portion of the directory names are disassociated with each other. That is, during the second mounting operation, the remaining one or more portions of the storage areas may not be associated with their corresponding directory names so that the remaining portions are not mounted, and therefore are not accessible to the user (for example the technician) using the electronic device when the electronic device is operating in accordance with the second mounting operation.

Referring to FIG. 9B, screens 906, 907, 908 are illustrated. These are screens which are displayed by the electronic device of the second mode. Based on the execution of a home application (and/or a launcher application), the electronic device may display the screen 906. The screen 906 may be referred as a home screen and/or a launcher screen. In the screen 906, the electronic device may display the status bar 911 and/or the navigation bar 910. While displaying the screen 906, the electronic device may identify an input for displaying a notification panel (e.g., a screen provided by a system process such as a notification manager). The input may include a drag gesture which is initiated from a point p1 on the status bar 911 and moved toward a direction 960 substantially parallel to a vertical direction of the display. The electronic device identifying the drag gesture may display the screen 907. The electronic device may display translucent screen 907 superimposed on the screen 906.

Referring to the exemplary screen 907, the electronic device may display the screen 907 including an area 971 indicating a current date, an area 972 where icons for adjusting states of hardware of the electronic device are arranged, an area 973 where buttons (e.g., buttons including texts such as "control device" and/or "output media") are displayed. Icons positioned in the area 972 may correspond to options for adjusting states of WiFi, ringtone mode, Bluetooth, an orientation of the electronic device and/or a flash light. In the screen 907, one or more notification messages generated by software applications executed by the electronic device are accumulated.

Referring to FIG. 9B, in the screen 907, the electronic device may display a visual object 970 associated with the second mode. Based on an input indicating to select the visual object 970, the electronic device may display the screen 908. That is, based on a user input indicating a selection of the visual object 970, the electronic device may display the screen 908. The screen 908 may include an option for terminating the second mode. In the screen 908 of FIG. 9B, the electronic device may display an image and/or text for describing the termination of the second mode. The text may be displayed in an area of the screen 908. In the screen 908, the electronic device may display a visual object 981 for indicating that a current mode of the electronic device corresponds to the second mode. The visual object 981 may include a text such as "a maintenance mode", but embodiments are not limited thereto.

In the screen 908 of FIB. 9B, the electronic device may display a visual object 980 for switching to another mode (e.g., the first mode) different from the second mode. The visual object 980 may include text such as "Turns Off", but embodiments are not limited thereto. In response to an input indicating a selection of the visual object 980, the electronic device may display a pop-up window 983 superimposed on the screen 908. In the pop-up window 983, the electronic device may display text informing the user that a reboot of the electronic device is required to terminate and/or cease the second mode. In the pop-up window 983, the electronic device may display a visual object 985 corresponding to an option for ceasing to display the pop-up window 983 (e.g., the visual object 985 including text such as "cancel").

Referring to FIG. 9B, in the pop-up window 983, the electronic device may display a visual object 984 for switching to the first mode from the second mode based on a reboot of the electronic device. In response to an input indicating the selection of the visual object 984, the electronic device may authorize the user performing the input. Based on the authorization, the electronic device may terminate the second mode and switch to the first mode. In response to an input to select the visual object 984, the electronic device may perform a reboot for switching to the first mode from the second mode. In an embodiment, while performing the reboot to switch to the first mode from the second mode, the electronic device may erase data (e.g., photographs, text and/or software applications which have been installed in the electronic device) that is modified and/or stored in the second mode. For example, while performing the reboot, the electronic device may restore (or rollback) a state of the electronic device to a state of the electronic device before switching to the second mode. That is, the electronic device may restore the electronic device to the state in which it was in before the electronic device switched to the second mode.

Figure 10:
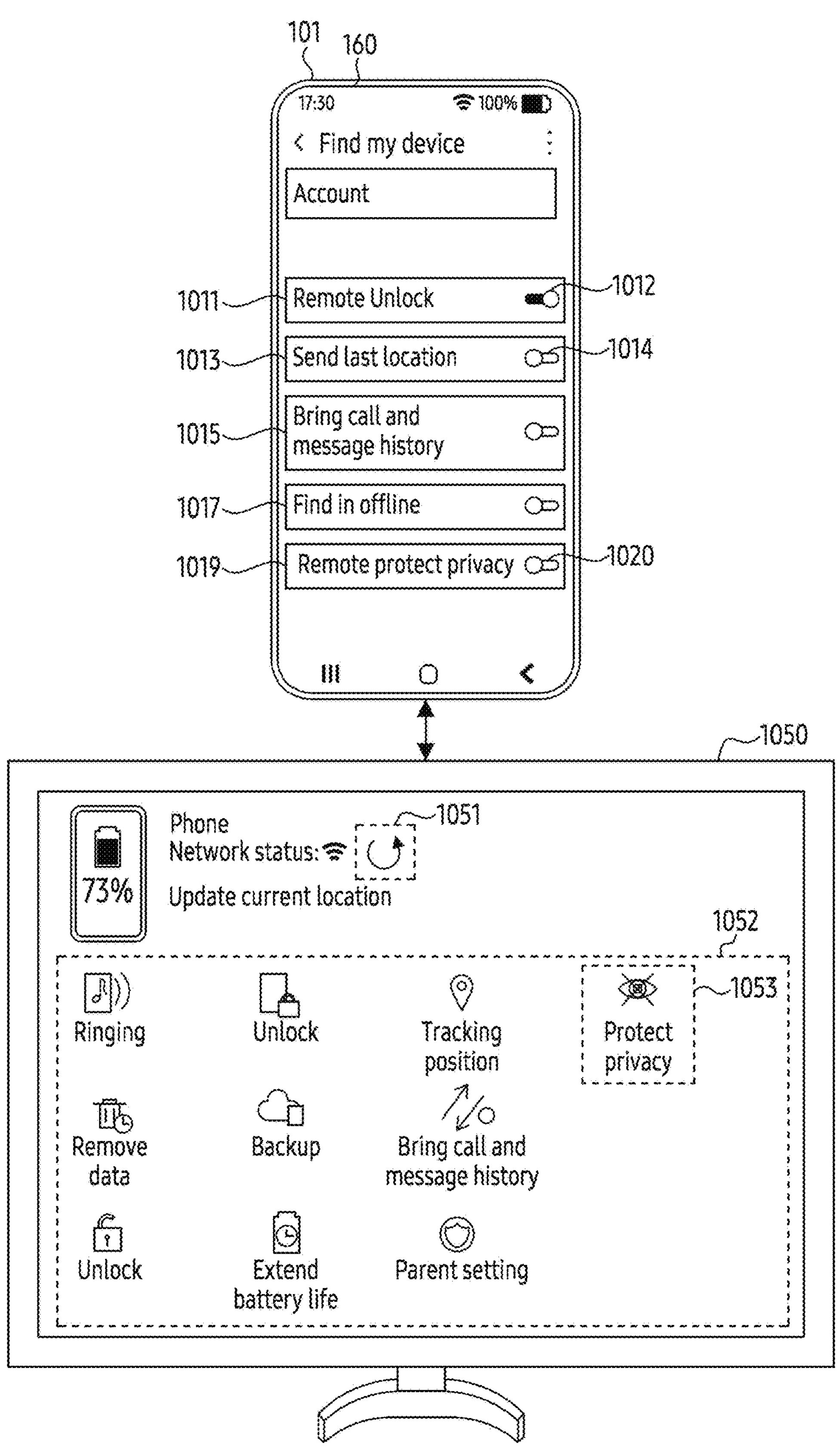
FIG. 10 illustrates an example of an electronic device providing a function for performing mounting operation based on network according to an embodiment.

FIG. 10 illustrates an example of an electronic device 101 providing a function for performing a mounting operation based on a network. The electronic device 101 of FIG. 10 may include the electronic device 101 of FIG. 1 to FIG. 8, FIG. 9A to FIG. 9B.

Referring to FIG. 10, the electronic device 101 according to an embodiment may display a screen for adjusting setting values associated with loss of the electronic device 101 through a display module 160. That is, the electronic device may display a screen for adjusting settings or setting values associated with functions that may be performed when a user has lost, misplaced or otherwise no longer has possession of the electronic device. The screen of FIG. 10, for example, may be displayed on the display module 160 based on an input to select the visual object 914 in the FIG. 9A. The electronic device 101 may display visual objects 1011, 1012 for obtaining setting values associated with a remote unlock function of the electronic device 101 on the display module 160. For example, based on the visual object 1012 associated with the visual object 1011 including text such as "remote unlock, the electronic device 101 may receive setting value with respect to remote unlock. That is, a user input on the visual object 1012 may change a setting value associated with the corresponding visual object 1011. The user input on the visual object 1012 may therefore enable or disable the function associated with visual object 1011. In this example, the user input on the visual object 1012 may enable or disable a remote unlock function of the electronic device. Although the visual object 1012 having a form of a switch is illustrated here, embodiments are not limited thereto.

For example, the electronic device 101 may display visual objects 1013, 1014 for obtaining a setting value associated with reporting a geographic location identified by the electronic device 101. The electronic device 101 may display a visual object 1015 for obtaining a setting value associated with reporting call history and/or message history. The electronic device 101 may display a visual object 1017 for obtaining setting values for obtaining a geographic location of the electronic device 101 while the electronic device 101 is not connected to a network (e.g., wireless network such as fifth generation (5G) wireless network). The electronic device 101 may display visual objects 1019, 1020 for obtaining setting values for remotely blocking accessing to a storage area where privacy information (e.g., a photograph, a video, a recorded audio and/or text stored in the electronic device 101 by a user of the electronic device 101) is stored among the plurality of storage areas of the electronic device based on a mounting operation with respect to the storage areas. For example, by using the visual object 1019 including text such as "remote protect privacy", the electronic device 101 may guide that the visual object 1020 is displayed to obtain the setting values. That is, in response to a user input to select the visual object 1019, the electronic device may further display visual object 1020 to enable the user to view or change current setting values associated with the function represented by visual object 1019. In response to an input to select the visual object 1020, the electronic device 101 may identify whether to allow a remote reboot of the electronic device 101 to block access to remaining storage areas different from storage area where the log information is stored. That is, in response to a user input to select the visual object 1020, the electronic device may allow or disallow a function of remotely rebooting the electronic device into the second mode according to the state shown by the visual object 1020.

Referring to FIG. 10, a screen for remotely controlling the electronic device 101 through a network such as an internet connection and displayed on a display of an external electronic device 1050 is exemplary illustrated. That is, FIG. 10 shows an example of a screen displayed on an external electronic device, wherein the screen enables a user of the external electronic device to control the electronic device 101 via a network connection. Referring to the screen displayed through the external electronic device 1050, a web page including an area 1052 including options for remotely controlling the electronic device 101 through network service (or cloud service) associated with the electronic device 101 may be provided. That is, the screen of the external electronic device may display a web page providing options for remotely controlling the electronic device 101 via a network or cloud service. The web page may include a button, visual object or icon 1051 for updating a state of the electronic device 101 displayed through the web page. That is, by providing an input to select the icon 1051, the user may receive updated information regarding a state of the electronic device 101. For example, updated information regarding a remaining battery life of the electronic device 101 may be displayed on the display of the electronic device 1050 in response to the user selecting the icon 1051. Through the area 1052 of the web page, options such as ringtone, remote lock, tracking position, erase data, backup, get call history and message history, remote unlock, extend battery life, parent settings of the electronic device 101 may be provided. Through the area 1052 of the web page, a visual object 1053 corresponding to an option for remotely blocking accessing to a specific storage area (e.g., other storage area different from storage area where the log information is stored) of the electronic device 101 may be displayed.

In an embodiment, in a state that rebooting the electronic device 101 remotely is allowed based on an input associated with the visual object 1020, a server identifying another input indicating to select the visual object 1052 may transmit, to the electronic device 101, a signal for entering a preset mode for controlling accessing to a portion of storage areas such as a maintenance mode. That is, when the visual object 1020 indicates that a remote privacy protection setting of the electronic device 101 is enabled, the electronic device 101 may be remotely rebooted. That is, the electronic device may be rebooted based on instructions communicated to the electronic device 101 via an external electronic device, such as the external electronic device 1050. When an input is made to select the visual object 1052 on the external electronic device 1050, a server may receive a signal or other notification that this input has been performed. In response to the server receiving a signal indicating that the visual object 1052 has been selected, the server may transmit a signal for entering a preset mode to the electronic device 101. The preset mode may be a mode for controlling the access to a portion of the storage area of the electronic device 101. The preset mode may be a maintenance mode. The electronic device 101 receiving the signal may switch to the maintenance mode based on reboot. That is, the electronic device 101 may reboot in order to switch to operating in the maintenance mode. The electronic device 101 entering the maintenance mode based on the reboot, may block access to at least a portion of the storage area by blocking a mounting operation with respect to a portion of storage area where privacy information is stored. That is, during the reboot of the electronic device 101, the one or more portions of the storage area which contain sensitive or private information may not be associated with a directory name, and so may not be mounted. By not mounting these portions of the storage area, access to these portions is blocked.

Figure 11:
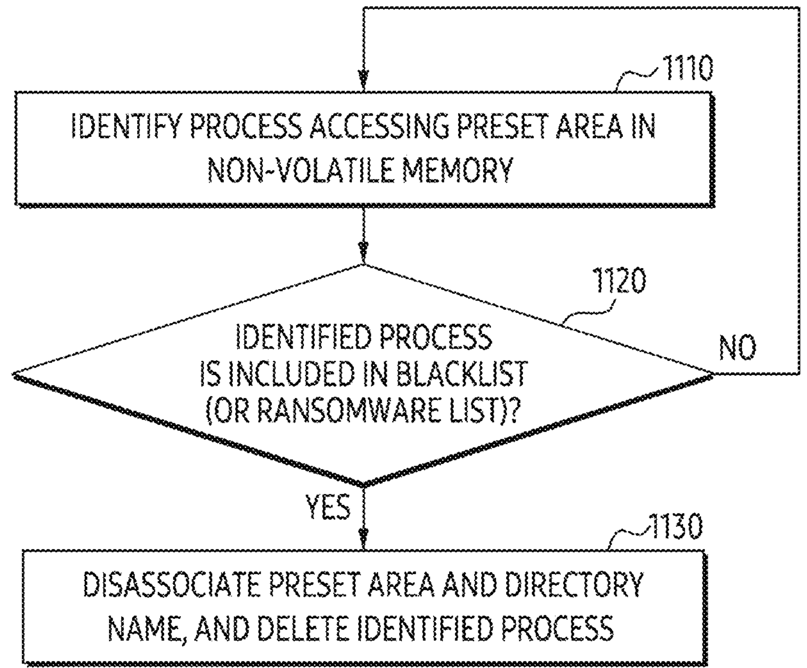
FIG. 11 illustrates an example of an operation of an electronic device according to an embodiment.

FIG. 11 illustrates an example of an operation of an electronic device according to an embodiment. At least one of operations of FIG. 11 may be performed by the electronic device 101 and/or the processor 120 of FIG. 2. At least one of the operations of FIG. 11 may be associated with at least one of the operations of FIG. 7 to FIG. 8. At least one of the operations of FIG. 11 may be performed based on the execution of a software application for monitoring abnormal operation of the electronic device such as vaccine or anti-virus software.

Referring to FIG. 11, in operation 1110, the processor of the electronic device according to an embodiment may identify a process for accessing a preset area in a non-volatile memory (e.g., the non-volatile memory 134 in FIG. 1). The electronic device may perform the operation 1110 in the first mode corresponding to the normal state. The preset area in the operation 1110 may include a storage area set to store user data (e.g., privacy information such as a photograph, a video, an e-mail, a document and/or audio) among a plurality of storage areas of the non-volatile memory.

Referring to FIG. 11 in operation 1120, the processor of the electronic device according to an embodiment may identify whether the process identified based on the operation 1110 is included in a black-list (or ransomware list). The black list may be provided by a software application executed by the processor to perform operations of FIG. 11.

If the process of the operation 1110 is not included in the black-list (operation 1120—NO), the processor may maintain monitoring with respect to a process based on the operation 1110. If the process of the operation 1110 is included in the black-list (operation 1120—YES), the processor may perform operation 1130.

Referring to FIG. 11, in operation 1130, the processor of the electronic device according to an embodiment may release a link between the preset area of the operation 1110 and a directory name, and erase the process identified based on the operation 1110. For example, the processor may disassociate a storage area accessed by the process identified by the operation 1110 and the directory name. The disassociation of the storage area and the directory name may be performed based on a reboot of the electronic device. Based on the reboot, the process of the operation 1110 may be terminated. The processor may erase instructions corresponding to the terminated process from a non-volatile memory.

Figure 12:
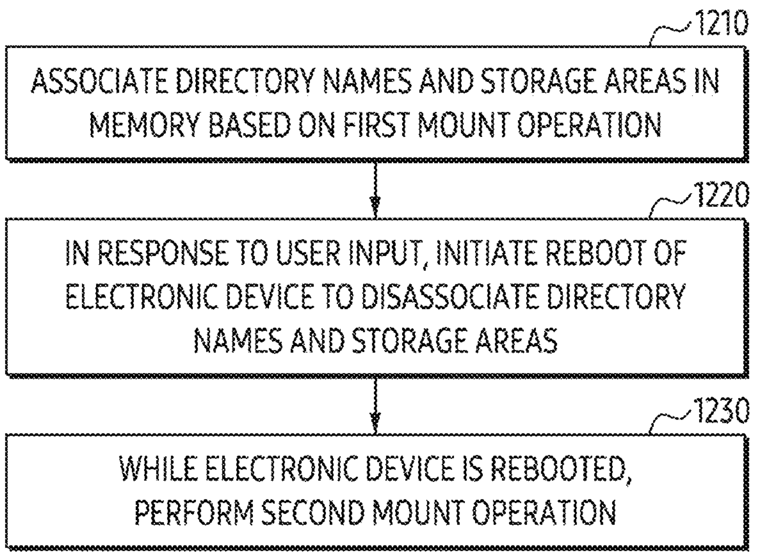
FIG. 12 illustrates an example of an operation of an electronic device according to an embodiment.

FIG. 12 illustrates an example of an operation of an electronic device according to an embodiment. The electronic device of FIG. 12 may be an example of the electronic device of FIG. 1 to FIG. 11. At least one of the operations of FIG. 12 may be performed by the electronic device 101 and/or the processor 120 of FIG. 2. At least one of the operations of FIG. 12 may be associated with at least one operations of FIG. 7, FIG. 8, and/or FIG. 11.

Referring to FIG. 12, in operation 1210, the processor of the electronic device according to an embodiment may associate directory names and storage areas of a memory based on a first mounting operation. That is, each of a plurality of storage areas of a memory may be associated with a unique directory name. The first mounting operation of the operation 1210 may include connecting (or linking) all of storage areas of the memory of the electronic device to directory names based on a first authority information corresponding to an owner-user. The electronic device may be operated in a first mode based on the first mounting operation.

Referring to FIG. 12, in operation 1220, the processor of the electronic device according to an embodiment may initiate a reboot of the electronic device to disassociate the storage areas and directory names in response to receiving a user input. The user input may be received through a visual object (e.g., the visual object 370 of FIG. 3, and/or the visual object 934 of FIG. 9A) provided by the electronic device when booted up based on the first mounting operation. The user input may be identified by substitution and/or extraction of a subscriber identification module (e.g., the subscriber identification module 196 of FIG. 1) that is inserted into the electronic device. The user input may be identified based on execution of a software application designed for a specific user (e.g., a child) such as kids mode. Based on the reboot, the electronic device may turn the electronic device off to disassociate the storage areas and the directory names. Based on the reboot, the electronic device may switch to a second mode. While the electronic device is turned on based on the reboot, the electronic device may perform an operation 1230. The reboot of the electronic device may comprise turning off the electronic device to cause the directory names to be disassociated from the corresponding storage areas. The reboot of the electronic device may comprise turning on the electronic device to boot the electronic device to a second mode.

Referring to FIG. 12, in operation 1230, the processor of the electronic device according to an embodiment may perform a second mounting operation while rebooting the electronic device. The second mounting operation of the operation 1230 may include connecting (or linking) a portion of the storage areas of the memory of the electronic device to a portion of the directory names. That is, each of a portion of the storage areas may be associated with a unique directory name. Based on the second mounting operation of the operation 1230, the remaining one or more portions of the storage areas are disassociated with the remaining one or more portions of the directory names. Since the remaining one or more portions of the storage areas are not linked to directory names, accessing to the remaining one or more portions among the storage areas may be blocked after the operation 1230.

When an owner or user of an electronic device has a technical, mechanical or other problem with the device that they are using, the user often visits a service center to perform repairs to the device. In general, when entrusting repairs, the user's terminal must be unlocked and entrusted to a repair engineer, but many users worry that they will be exposed to problems such as the repair engineer reading, copying or otherwise using the user's personal information.

As described above, according to an embodiment, the electronic device may bypass performing a mount operation based on the first authority information corresponding to a user (e.g., the owner user) accessible to all areas in the storage in a specific state. The specific state may be a state in which another user (e.g., the sub-user) different from the user is identified to access the electronic device, such as a repair mode. In the specific state, the electronic device may selectively perform a mount operation regarding a specific area in the storage corresponding to the second authority information different from the first authority information. Since performing a mount operation regarding another area in the storage different from the specific area is blocked, the electronic device may block data (e.g., data related to the privacy of the owner user) stored in the other area from being viewed by the other user. That is, any areas in the storage which are not mounted are not accessible to the sub-user, so the sub-user cannot view any of the data stored within the non-mounted areas. When the electronic device mounts the specific area, and does not mount, or prevents or blocks the mounting of areas which are not the specific area, the sub-user may only access the data stored within the specific area and cannot access the data stored within the areas which have been blocked or prevented from being mounted.

In the present invention, it is possible to collect device problem information by mounting the storage of the device for a sub-user for a repair mode, without having to mount the owner user's storage areas containing personal or private data. That is, it is possible to mount only a portion of the areas of the storage such that the repair technician, or another sub-user of the device, is not able to access areas of the storage which may contain the owner user's personal or private data. It is not necessary to mount the owner user's storage areas in order to, or before, mounting the storage areas to which the sub-user may access. There is therefore a device and method which enable the provision of a service in which only problem information of a device may be extracted without accessing the personal information of the user.

A method for controlling access of an electronic device to a partition of a storage and/or areas within the partition based on authority information may be required. That is, a method for controlling whether an electronic device may access a partition or portion of a storage and/or specific areas within the partition or portion of the storage, based on authority information may be required.

As described above, according to an embodiment, an electronic device (e.g., the electronic device 101 of FIG. 2) may comprise a storage (e.g., storage 206 of FIG. 2) and a processor or controller (e.g., processor 120 of FIG. 2). The processor may be configured to identify, among a first authority information accessible to all areas of the storage and a second authority information different from the first authority information, whether an input indicating the performing of a mount operation or process based on the second authority information is received. The processor may be configured to obtain, in a first state in which the input is received, at least one directory name (e.g., directory name 620 of FIG. 6B) assigned to at least one area among the areas (e.g., the first area 212-1 to the third area 212-3) based on the second authority information, and bypass the performing of the mount operation based on the first authority information. The processor may be configured to obtain, in a second state different from the first state, a plurality of directory names (e.g., directory names 610, 620, and 630 of FIG. 6A) assigned to each of the areas based on the first authority information. The electronic device according to an embodiment may control access to a partition of the storage and/or areas in the partition based on the authority information.

For example, each of the areas of the storage may include permission information indicating that an area is owned by at least one of users corresponding to each of a plurality of authority information including the first authority information and the second authority information. That is, each area of the storage may be owned by at least one of the users of the electronic device. Each user may be associated with authority information. The first authority information may relate to or be associated with an owner user of the electronic device. The second authority information may relate to or be associated with a sub-user of the electronic device, such as a repair technician or other alternative user of the device.

For example, the processor may be configured to identify, among the areas in the first state, at least one first area owned by a user corresponding to the second authority information based on permission information of the areas. The processor may be configured to obtain the at least one directory name assigned to the at least one first area by performing a mount operation regarding the at least one first area among the at least one first area and at least one second area different from the at least one first area. That is, the processor may be configured to identify at least one first area of the storage which is owned by the user who corresponds to the second authority information, based on the permission information of the areas of the storage. Each area of the storage may be associated with permission information which indicates one or more users who own or are entitled to view the area of the storage and the data stored within the area of the storage. The processor may be configured to perform a mounting process or operation on the at least one first area, and to assign at least one directory name to the at least one first area.

For example, the processor may be configured to refrain from assigning, in the first state, a directory name to the at least one second area owned by another user different from the user corresponding to the second authority information. That is, a directory name may not be assigned to the at least one second area wherein the at least one second area is not owned by the user corresponding to the second authority information. The processor may be configured to not mount the second area which is not owned by the user corresponding to the second authority information, and therefore not obtain, assign or otherwise acquire a directory name for the unmounted second area of the storage.

For example, the permission information may be configured to include one or more flags indicating whether at least one of read, write, or access to the area corresponding to the permission information is allowed for each of a first user among the users owning an area of the storage corresponding to the permission information, a user group including the first user, and at least one second user distinct from the user group.

For example, the processor may be configured to execute, in the first state, a preset process 560 for controlling access to the storage based on an application executed by the processor, wherein the preset process (e.g., the media provider 560 of FIG. 4) is associated with the mounting operation based on the first authority information.

For example, the processor may be configured to access, based on the execution of the preset process in the first state, at least one file in at least one area stored by the application executed according to the second authority information.

For example, the at least one area which is accessible by the second authority information, from among the plurality of areas of the storage, may be configured to include a preset area for storing log information accumulated by at least one application from among the plurality of applications executed by the processor.

For example, the processor may be configured to receive, in the second state, an input indicating that a visual object (e.g., the visual object 370 in FIG. 3) for changing to the first state for extracting the log information among the areas is selected.

For example, the processor may be configured to receive, in the second state, the input indicating that visual objects (e.g., visual objects 412, 414, and 416 in FIG. 4) for changing to a user corresponding to the second authority information is selected.

As described above, according to an embodiment, a method of an electronic device may comprise identifying (e.g., operations 710 and 720 of FIG. 7), among a first authority information accessible to all areas of a storage of the electronic device (that is, wherein the first authority information allows or enables access to all of the areas of a storage by a user) and a second authority information different from the first authority information (that is, wherein the second authority information does not allow or enable access to all of the areas of a storage by a user corresponding to the second authority information, such that at least one area of the storage and the data stored therein is blocked or otherwise prevented from being accessed by the user corresponding to the second authority information), whether an input indicating performing a mount operation based on the second authority information is received. The method may comprise obtaining (e.g., operation 40 of FIG. 7), in a first state in which the input is received, at least one directory name (e.g., the directory name 620 of FIG. 6B) assigned to at least one area among the areas based on the second authority information, and bypassing performing the mount operation based on the first authority information. The method may comprise obtaining (e.g., operation 730 of FIG. 7), in a second state different from the first state, a plurality of directory names (e.g., directory names 610, 620, 630 of FIG. 6A) assigned to each of the areas based on the first authority information. In other words, the method of an electronic device may comprise identifying whether an input for performing a mounting operation based on a second authority information has been received, wherein a first authority information enables access to all of a plurality of areas of a storage of the electronic device and the second authority information is different to the first authority information. The method may comprise obtaining, in a first state in which the input for performing the mounting operation based on the second authority information is received, at least one directory name assigned to at least one area from among the plurality of areas of the storage. The method may comprise obtaining, in a second state different to the first state, wherein the input for performing a mounting operation based on the second authority information is not received, and based on the first authority information, a plurality of directory names assigned to each of the plurality of areas of the storage.

For example, each of the areas of the storage may include permission information indicating that an area is owned by at least one of users corresponding to each of a plurality of authority information including the first authority information and the second authority information.

For example, obtaining the at least one directory name may further comprise identifying, among the areas in the first state, at least one first area owned by a user corresponding to the second authority information based on permission information of the areas. For example, obtaining the at least one directory name may further comprise obtaining the at least one directory name assigned to the at least one first area by performing a mount operation regarding the at least one first area among the at least one first area and at least one second area different from the at least one first area.

For example, obtaining the at least one directory name may further comprise bypassing assigning a directory name to the at least one second area that is owned by another user different from the user corresponding to the second authority information. That is, the at least one second area which is not owned by the user corresponding to the second authority information may not be assigned a directory name.

For example, the method may further comprise executing, in the first state, a preset process for controlling access to the storage based on an application executed by a processor of the electronic device, wherein the preset process is associated with the mounting operation based on the first authority information.

For example, the method may further comprise accessing, based on the execution of the preset process in the first state, at least one file in at least one area stored by the application executed according to the second authority information.

For example, the at least one area among the areas that is accessible by the second authority information may be configured to include, a preset area for storing log information accumulated by at least one of the applications executed by the processor of the electronic device.

For example, the method may further comprise receiving, in the second state, an input indicating that a visual object (e.g., the visual object 370 of FIG. 3) for changing to the first state for extracting the log information among the areas is selected.

For example, the method may further comprise receiving, in the second state, an input indicating that one or more visual objects (e.g., visual objects 412, 414, and 416 of FIG. 4) for changing to a user corresponding to the second authority information is selected.

As described above, according to an embodiment, a non-transitory computer readable storage medium for storing one or more programs, the one or more programs may include instructions configured or arranged to cause, when executed by a processor of the electronic device, the electronic device to identify, among a first authority information accessible to all areas of the storage and a second authority information different from the first authority information, whether an input indicating the performing of a mount operation based on the second authority information is received. The one or more programs may include instructions configured or arranged to cause, when executed by a processor of the electronic device, the electronic device to obtain, in a first state in which the input is received, at least one directory name (e.g., directory name 620 of FIG. 6B) assigned to at least one area among the areas based on the second authority information, and bypass the performing of the mount operation based on the first authority information. The one or more programs may include instructions configured or arranged to cause, when executed by a processor of the electronic device, the electronic device to obtain, in a second state different from the first state, a plurality of directory names (e.g., directory names 610, 620, 630 of FIG. 6A) assigned to each of the areas based on the first authority information.

For example, each of the areas of the storage may include permission information indicating that an area is owned by at least one of the users corresponding to each of a plurality of authority information including the first authority information and the second authority information.

For example, the one or more programs may include instructions configured or arranged to cause, when executed by a processor of the electronic device, the electronic device to identify, among the areas in the first state, at least one first area owned by a user corresponding to the second authority information based on permission information of or associated with the areas of the storage. The one or more programs may include instructions configured or arranged to cause, when executed by a processor of the electronic device, the electronic device to assign the at least one directory name assigned to the at least one first area by performing a mounting operation regarding the at least one first area among the at least one first area and at least one second area different from the at least one first area.

For example, the one or more programs may include instructions configured or arranged to cause, when executed by a processor of the electronic device, the electronic device to refrain from assigning, in the first state, a directory name to the at least one second area owned by another user different from the user corresponding to the second authority information.

For example, the one or more programs may include instructions configured or arranged to cause, when executed by a processor of the electronic device, the electronic device to execute, in the first state, a preset process 560 for controlling access to the storage based on an application executed by the processor, wherein the preset process 560 is associated with the mounting operation based on the first authority information.

For example, the one or more programs may include instructions configured or arranged to cause, when executed by a processor of the electronic device, the electronic device to access, based on the execution of the preset process in the first state, at least one file in at least one area stored by the application executed according to the second authority information.

For example, the at least one area among the areas that are accessible by the second authority information may be configured to include, a preset area for storing log information accumulated by at least one application executed by the processor.

According to an embodiment, an electronic device may comprise at least one processor, memory configured to store instructions which, when executed by the at least one processor, cause the electronic device to identify a user input while the electronic device is operating in a first mode wherein, in the first mode of the electronic device, each of a plurality of storage areas is associated with a corresponding directory name based on a first mounting operation in a first mode. The instructions are configured to, when executed by the processor, cause the electronic device to, in response to the identified user input, turn off the electronic device to cause the directory names to be disassociated from the corresponding storage areas, and turn on the electronic device to boot the electronic device to a second mode. The instructions are configured to, when executed by the processor, cause the electronic device to, while the electronic device is being booted to the second mode, identify a portion of the plurality of storage areas in which log information is stored. The instructions are configured to, when executed by the processor, cause the electronic device to, perform a second mounting operation, different from the first mounting operation, to associate a portion of the directory names with the identified portion of the storage areas, and to not associate a remaining portion of the storage areas with a remaining portion of the directory names such that the remaining portion of the directory names remains disassociated with the remaining portion of the storage areas to disable an access to information stored in the remaining portion of the storage areas.

For example, the instructions are configured to, when executed by the processor, cause the electronic device to, store, in the identified portion of the storage areas, the log information that is accumulated by at least one software application executed by the processor when the electronic device is operating in the first mode.

For example, the instructions are configured to, when executed by the processor, cause the electronic device to, bypass associating the remaining portion of the directory names to the remaining portion of the storage areas while the electronic device is booted in the second mode.

For example, the instructions are configured to, when executed by the processor, cause the electronic device to identify the user input by identifying a selection, by the user, of a visual object; wherein the visual object is provided when the electronic device is operating in the first mode, and wherein the visual object comprises text for describing a maintenance mode, wherein the maintenance mode is the second mode.

For example, the instructions are configured to, when executed by the processor, cause the electronic device to, while the electronic device is being booted in the second mode, identify the portion of the storage areas based on whether an owner of each of the storage areas corresponds to sub-user indicated by authority information of the second mode.

For example, the instructions are configured to, when executed by the processor, cause the electronic device to identify the authority information different from a first authority information wherein the first authority information indicates owner-user has access to all of the storage areas of the memory. The first authority information is used to perform the first mounting operation.

For example, the instructions are configured to, when executed by the processor, cause the electronic device to, based on permission information of each of the storage areas, identify the portion of the storage areas. The permission information of each of the storage areas includes one or more flags indicating whether each of an owner, a user group including the owner, and another user different from the user group is allowed to read, write or access a storage area corresponding to the permission information.

For example, the instructions are configured to, when executed by the processor, cause the electronic device to, while the electronic device being booted in the second mode, identify the portion of the storage areas by comparing owners of the storage areas indicated by the permission information to the sub-user indicated by the authority information.

According to an embodiment, a method of an electronic device may comprise identifying a user input while the electronic device is operating in a first mode wherein, in the first mode of the electronic device, each of a plurality of storage areas of memory of the electronic device is associated with a corresponding directory name based on a first mounting operation. The method may comprise, in response to identified user the input, turning off the electronic device to cause the directory names to be disassociated from the corresponding storage areas and turning on the electronic device to boot the electronic device to a second mode. The method may comprise, while the electronic device being booted to the second mode, identifying a portion of the plurality of the storage areas in which log information is stored. The method may comprise performing a second mounting operation, different from the first mounting operation, to associate a portion of the directory names while the identified portion of the storage areas, and to not associate a remaining portion of the storage areas with a remaining portion of the directory names such that the remaining portion of the directory names remains disassociated with the remaining portion of the storage areas to disable access to information stored in the remaining portion of the storage areas.

The method of the electronic device may comprise storing, in the identified portion of the storage areas, the log information that is accumulated by at least one software application executed by a processor when the electronic device is operating in the first mode.

The method of the electronic device, wherein the performing the second mounting operation may comprise bypassing associating the remaining portion of the directory names to the remaining portion of the storage areas while the electronic device is booted in the second mode.

The method of the electronic device, wherein the identifying the user input by identifying a selection, by the user, of a visual object. The visual object is provided when the electronic device is operating in the first mode, and wherein the visual object comprises text for describing a maintenance mode, wherein the maintenance mode is the second mode.

The method of the electronic device, wherein the identifying the portion may comprise identifying the portion of the storage areas based on whether an owner of each of the storage areas corresponds to a sub-user indicated by authority information of the second mode.

The method of the electronic device, wherein the identifying the portion may comprise identifying the authority information different from first authority information wherein the first authority information indicates an owner-user who has access to all of the storage areas of the memory. The first authority information is used to perform the first mounting operation.

The method of the electronic device, wherein the identifying the portion may comprise, based on permission information of each of the storage areas, identifying the portion of the storage areas. The permission information of each of the storage areas may include one or more flags indicating whether each of an owner, a user group including the owner, and another user different from the user group is allowed to read, write, or access a storage area corresponding to the permission information.

According to an embodiment, an electronic device may comprise memory configured to store instructions, a display and a processor. The instructions are configured to, when executed by the processor, cause the electronic device to identify a request to access the memory after booting up the electronic device. The instructions are configured to, when executed by the processor, cause the electronic device to control the access to the memory, while the electronic device is booted up with a first mounting operation, based on first list of directory names associated with storage areas of the memory. The instructions are configured to, when executed by the processor, cause the electronic device to control the access to the memory, while the electronic device is booted up with a second mounting operation, based on second list of a portion of the directory names associated with a portion of the storage areas, wherein remaining portion of the directory names are disassociated with remaining portion of the storage areas according to the second mounting operation.

According to an embodiment, a non-transitory computer readable storage medium for storing one or more programs may be provided. The one or more programs are, when executed by a processor of the electronic device, cause the electronic device to identify a user input while the electronic device is operating in a first mode. In the first mode of the electronic device, each of a plurality of storage areas is associated with a corresponding directory name based on a first mounting operation. The one or more programs are configured to, when executed by the processor, cause the electronic device to, in response to the identified user input, turn off the electronic device to cause the directory names to be disassociated from the corresponding storage areas, and turn on the electronic device to boot the electronic device to a second mode. The one or more programs are configured to, when executed by the processor, cause the electronic device to, while the electronic device is being booted to the second mode, identify a portion of the plurality of storage areas in which log information is stored. The one or more programs are configured to, when executed by the processor, cause the electronic device to, perform a second mounting operation, different from the first mounting operation, to associate a portion of the directory names with the identified portion of the storage areas, and to not associate a remaining portion of the storage areas with a remaining portion of the directory names such that the remaining portion of the directory names remains disassociated with the remaining portion of the storage areas to disable an access to information stored in the remaining portion of the storage areas.

For example, the one or more programs are configured to, when executed by the processor, cause the electronic device to, store, in the identified portion of the storage areas, the log information that is accumulated by at least one software application executed by the processor when the electronic device is operating in the first mode.

For example, the one or more programs are configured to, when executed by the processor, cause the electronic device to, bypass associating the remaining portion of the directory names to the remaining portion of the storage areas while the electronic device is booted in the second mode.

For example, the one or more programs are configured to, when executed by the processor, cause the electronic device to identify the user input by identifying a selection, by the user, of a visual object. The visual object is provided when the electronic device is operating in the first mode, and wherein the visual object comprises text for describing a maintenance mode, wherein the maintenance mode is the second mode.

For example, the one or more programs are configured to, when executed by the processor, cause the electronic device to, while the electronic device is being booted in the second mode, identify the portion of the storage areas based on whether an owner of each of the storage areas corresponds to sub-user indicated by authority information of the second mode.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved. It will be appreciated that the above-described embodiments, and their technical features, may be combined with one another in each and every combination, potentially unless there is a conflict between two embodiments or features. That is, each and every combination of two or more of the above-described embodiments is envisaged and included within the present disclosure. One or more features from any embodiment may be incorporated in any other embodiment, and provide a corresponding advantage or advantages.

Therefore, other implementations, other embodiments, and equivalents to the claims fall within the scope of the claims to be described later.

Further aspects and embodiments of the invention may be provided in accordance with the following numbered paragraphs.

Paragraph 1:

An electronic device comprising:

a storage comprising a plurality of areas; and a processor; wherein the processor is configured to identify whether an input for performing a mounting operation based on a second authority information has been received, wherein a first authority information allows access to all of the plurality of areas of a storage of the electronic device and the second authority information is different to the first authority information;

obtaining, in a first state in which the input for performing the mounting operation based on the second authority information is received, at least one directory name assigned to at least one first area from among the plurality of areas of the storage; and not obtaining, in the first state, at least one directory name assigned to at least one second area different to the at least one first area, from among the plurality of areas of the storage;

wherein the at least one second area corresponds to an area of the storage in which the second authority information does not allow access.

Paragraph 2:

The electronic device of paragraph 1, wherein the processor is further configured to obtain, in a second state in which the input for performing a mounting operation based on the second authority information is not received, a plurality of directory names assigned to each of the plurality of areas of the storage based on the first authority information.

Paragraph 3:

The electronic device of paragraph 1 or 2, wherein each of the areas of the storage includes permission information, the permission information indicating at least one user who owns the area, and wherein each user is assigned to one of the first authority information and the second authority information.

Paragraph 4:

The electronic device of paragraph 3, wherein the processor is further configured to:

determine the at least one first area owned by a user corresponding to the second authority information based on the permission information of the areas; and obtain the at least one directory name assigned to the at least one first area by performing a mounting operation for the at least one first area.

Paragraph 5:

The electronic device of paragraph 3 or paragraph 4, wherein the processor is further configured to refrain from assigning, in the first state, a directory name to the at least one second area identified as being owned by another user different from the user corresponding to the second authority information.

Paragraph 6:

The electronic device of any of paragraphs 3 to 5, wherein the permission information is configured to include one or more flags indicating whether at least one of reading to, writing to, or accessing the area corresponding to the permission information is allowed for each of a first user among the users owning an area of the storage corresponding to the permission information, a user group including the first user, and at least one second user distinct from the user group.

Paragraph 7:

The electronic device of any of the preceding paragraphs, wherein the processor is further configured to execute, in the first state, a preset process 560 for controlling access to the storage based on an application executed by the processor, wherein the preset process 560 is associated with the mounting operation based on the first authority information.

Paragraph 8:

The electronic device of paragraph 7, wherein the processor is further configured to access, based on the execution of the preset process in the first state, at least one file in at least one second area stored by the application executed according to the second authority information.

Paragraph 9:

The electronic device of any of the preceding claims, wherein the at least one second area among the areas that are accessible by the second authority information is configured to include a preset area for storing log information accumulated by at least one application executed by the processor.

Paragraph 10:

The electronic device of any of the preceding paragraphs, wherein the processor is further configured to receive, in a second state in which the input for performing the mounting operation based on the second authority information is not received, a second input indicating that a visual object 370 for changing to the first state for extracting the log information among the areas is selected.

Paragraph 11:

The electronic device of any of the paragraphs 1 to 9, wherein the processor is further configured to receive, in a second state in which the input for performing the mounting operation based on the second authority information is not received, a third input indicating that one or more visual objects 412, 414, 415 for changing to a user corresponding to the second authority information are selected.

No claim element is to be construed under the provisions of 35 U.S.C. § 112, sixth paragraph, unless the element is expressly recited using the phrase "means for" or "means".

What is claimed is:

1. An electronic device comprising:

memory including one or more storage media storing instructions; and at least one processor including processing circuitry, wherein the instructions, when executed by the at least one processor individually or collectively, cause the electronic device to:

identify a user input while the electronic device is operating in a normal mode wherein, in the normal mode of the electronic device, each of a plurality of storage areas of the memory is associated with a corresponding directory name based on a first mounting operation such that each of the plurality of storage areas of the memory is accessible by using the corresponding directory name;

in response to the identified user input, turn off the electronic device to cause the directory names to be disassociated from the corresponding storage areas, and turn on the electronic device to boot the electronic device to a maintenance mode, and while the electronic device is being booted to the maintenance mode:

identify a portion of the plurality of storage areas in which log information is to be stored;

perform a second mounting operation, different from the first mounting operation, to associate a portion of the directory names with the identified portion of the storage areas, wherein remaining portions of the directory names are not associated with remaining portions of the storage areas such that the remaining portions of the storage areas are not accessible by using the corresponding directory name; and store, in the identified portion of the storage areas, log information that corresponds to at least one of (i) at least one of an execution history of software applications, an error history, or an interrupt history occurred in the electronic device when the electronic device was operated in the normal mode, or (ii) an event history occurred in the electronic device when the electronic device was operated in the normal mode.

2. The electronic device of claim 1, wherein the instructions, when executed by the at least one processor, further cause the electronic device to:

identify the user input by identifying a selection, by a user, of a visual object; wherein the visual object is provided when the electronic device is operating in the normal mode, and wherein the visual object comprises text for describing the maintenance mode.

3. The electronic device of claim 1, wherein the instructions, when executed by the at least one processor, further cause the electronic device to:

while the electronic device is being booted in the maintenance mode, identify the portion of the storage areas based on whether an owner of each of the storage areas corresponds to a sub-user indicated by authority information of the maintenance mode.

4. The electronic device of claim 3, wherein the instructions, when executed by the at least one processor, further cause the electronic device to:

identify the authority information different from a first authority information wherein the first authority information indicates an owner-user who has access to all of the storage areas of the memory, and wherein the first authority information is used to perform the first mounting operation.

5. The electronic device of claim 3, wherein the instructions, when executed by the at least one processor, further cause the electronic device to:

based on permission information of each of the storage areas, identify the portion of the storage areas, wherein the permission information of each of the storage areas includes one or more flags indicating whether each of an owner, a user group including the owner, and another user different from the user group is allowed to read, write or access a storage area corresponding to the permission information.

6. The electronic device of claim 5, wherein the instructions, when executed by the at least one processor, further cause the electronic device to:

while the electronic device is being booted in the maintenance mode, identify the portion of the storage areas by comparing owners of the storage areas indicated by the permission information to the sub-user indicated by the authority information.

7. A method of an electronic device, comprising:

identifying a user input while the electronic device is operating in a normal mode wherein, in the normal mode of the electronic device, each of a plurality of storage areas of memory of the electronic device is associated with a corresponding directory name based on a first mounting operation such that each of the plurality of storage areas of the memory is accessible by using the corresponding directory name;

in response to the identified user input, turning off the electronic device to cause the directory names to be disassociated from the corresponding storage areas and turning on the electronic device to boot the electronic device to a maintenance mode, and while the electronic device is being booted to the maintenance mode:

identifying a portion of the plurality of storage areas in which log information is to be stored;

performing a second mounting operation, different from the first mounting operation, to associate a portion of the directory names with the identified portion of the storage areas, wherein remaining portions of the directory names are not associated with remaining portions of the storage areas such that the remaining portions of the storage areas are not accessible by using the corresponding directory name; and storing, in the identified portion of the storage areas, log information that corresponds to at least one of (i) at least one of an execution history of software applications, an error history, or an interrupt history occurred in the electronic device when the electronic device was operated in the normal mode, or (ii) an event history occurred in the electronic device when the electronic device was operated in the normal mode.

8. The method of any of claim 7, wherein identifying the input comprises:

identifying the user input by identifying a selection, by a user, of a visual object; wherein the visual object is provided when the electronic device is operating in normal mode, and wherein the visual object comprises text for describing maintenance mode.

9. The method of any of claim 7, wherein identifying the portion comprises:

identifying the portion of the storage areas based on whether an owner of each of the storage areas corresponds to a sub-user indicated by authority information of the maintenance mode.

10. The method of claim 9, wherein identifying the portion comprises:

identifying authority information different from a first authority information wherein the first authority information indicates an owner-user who has access to all of the storage areas of the memory, and wherein the first authority information is used to perform the first mounting operation.

11. The method of claim 9, wherein identifying the portion comprises:

based on permission information of each of the storage areas, identifying the portion of the storage areas, wherein the permission information of each of the storage areas includes one or more flags indicating whether each of an owner, a user group including the owner, and another user different from the user group is allowed to read, write or access a storage area corresponding to the permission information.

12. A non-transitory computer readable storage medium for storing one or more programs, wherein the one or more programs, when executed by a processor of an electronic device, cause the electronic device to:

identify a user input while the electronic device is operating in a normal mode wherein, in the normal mode of the electronic device, each of a plurality of storage areas of memory is associated with a corresponding directory name based on a first mounting operation such that each of the plurality of storage areas of the memory is accessible by using the corresponding directory name;

in response to the identified user input, turn off the electronic device to cause the directory names to be disassociated from the corresponding storage areas, and turn on the electronic device to boot the electronic device to a maintenance mode; and while the electronic device is being booted to the maintenance mode:

identify a portion of the plurality of storage areas in which log information is to be stored;

perform a second mounting operation, different from the first mounting operation, to associate a portion of the directory names with the identified portion of the storage areas, wherein remaining portions of the directory names are not associated with remaining portions of the storage areas such that the remaining portions of the storage areas are not accessible by using the corresponding directory name; and store, in the identified portion of the storage areas, log information that corresponds to at least one of (i) at least one of an execution history of software applications, an error history, or an interrupt history occurred in the electronic device when the electronic device was operated in the normal mode, or (ii) an event history occurred in the electronic device when the electronic device was operated in the normal mode.

13. The non-transitory computer readable storage medium of claim 12, wherein the one or more programs, when executed by the processor, cause the electronic device to:

identify the user input by identifying a selection, by a user, of a visual object of a visual object that is provided when the electronic device is operating in the normal mode, and wherein the visual object comprises text for describing the maintenance mode.

14. The non-transitory computer readable storage medium of claim 12, wherein the one or more programs, when executed by the processor, cause the electronic device to:

identify, while the electronic device is being booted in the maintenance mode, the portion of the storage areas based on whether an owner of each of the storage areas corresponds to sub-user indicated by authority information of the maintenance mode.

* * * * *